(12) United States Patent
Takahashi et al.

(10) Patent No.: US 6,725,155 B1
(45) Date of Patent: Apr. 20, 2004

(54) METHOD AND APPARATUS FOR INFORMATION PROCESSING, AND MEDIUM FOR INFORMATION PROCESSING

(75) Inventors: Yoshikazu Takahashi, Saitama (JP); Yasuhiko Kato, Tokyo (JP); Kenichiro Kobayashi, Kanagawa (JP); Masanori Omote, Kanagawa (JP); Ai Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/673,112

(22) PCT Filed: Feb. 9, 2000

(86) PCT No.: PCT/JP00/00721

§ 371 (c)(1),
(2), (4) Date: Dec. 22, 2000

(87) PCT Pub. No.: WO00/47951

PCT Pub. Date: Aug. 17, 2000

(30) Foreign Application Priority Data

Feb. 9, 1999 (JP) .......................................... 11-031119

(51) Int. Cl.⁷ .............................................. G01C 21/00
(52) U.S. Cl. .......................... 701/209; 701/24; 701/213
(58) Field of Search .......................... 701/1, 200, 207, 701/208, 209, 210, 211, 213; 342/357.01, 357.03, 357.06, 357.1, 357.12, 357.13; 340/988, 990, 995, 90; 73/178 R; 455/456

(56) References Cited

U.S. PATENT DOCUMENTS

| | | | | | |
|---|---|---|---|---|---|
| 5,543,789 A | * | 8/1996 | Behr et al. | .................. | 340/995 |
| 5,850,190 A | * | 12/1998 | Wicks et al. | .................. | 340/905 |
| 6,104,316 A | * | 8/2000 | Behr et al. | .................. | 340/995 |
| 6,107,944 A | * | 8/2000 | Behr et al. | .................. | 340/995 |
| 6,107,961 A | * | 8/2000 | Takagi | .................. | 342/357.13 |
| 6,199,045 B1 | * | 3/2001 | Giniger et al. | .................. | 705/1 |
| 6,278,939 B1 | * | 8/2001 | Robare et al. | .............. | 701/208 |
| 6,292,743 B1 | * | 9/2001 | Pu et al. | .................... | 701/202 |
| 6,314,295 B1 | * | 11/2001 | Kawamoto | .................. | 455/456 |
| 6,314,365 B1 | * | 11/2001 | Smith | .......................... | 701/200 |
| 6,347,113 B1 | * | 2/2002 | Hatch | .......................... | 375/149 |

FOREIGN PATENT DOCUMENTS

| | | | |
|---|---|---|---|
| FR | 816803 A1 | * | 1/1998 |
| JP | 7-152787 | | 6/1995 |
| JP | 9-101168 | | 4/1997 |
| JP | 9-182143 | | 7/1997 |
| JP | 10-502174 | | 2/1998 |
| JP | 10-132591 | | 5/1998 |
| JP | 10-185609 | | 7/1998 |
| JP | 10-319840 | | 12/1998 |
| WO | WO96/00373 | | 1/1996 |

* cited by examiner

*Primary Examiner*—Yonel Beaulieu
(74) *Attorney, Agent, or Firm*—Frommer Lawrence & Haug LLP; William S. Frommer; Dennis M. Smid

(57) ABSTRACT

When an user inputs route search conditions such as place where the user is now, destination, and moving purpose, the route search conditions are transmitted to a navegation server. In the navegation server, map data corresponding to the route search conditions is detected and provided to a portable terminal.

30 Claims, 15 Drawing Sheets

NAVIGATION SERVER 4

METHOD AND APPARATUS FOR INFORMATION PROCESSING, AND MEDIUM FOR INFORMATION PROCESSING

TECHNICAL FIELD

The present invention relates to an information processing apparatus and the method, and a providing medium, and more particularly, relates to an information processing apparatus and the method and a providing medium which can guide a variety of routes without holding map data.

BACKGROUND ARTS

The car navigation equipment which applies the GPS (Global Positioning System) for receiving radio waves from a predetermined man-made satellite to obtain the latitude and longitude of the place where one is now has been spreading.

However, a conventional car navigation equipment is composed of many devices such as a GPS receiving device, a drab for reproducing the map data stored in a recording medium such as a CD-ROM or a DVD-ROM, a display for displaying map pictures, and a control device such as a CPU for controlling these devices, so that the size of car navigation equipment becomes large and there is a problem that a car navigation equipment is difficult to be used portably. Moreover, devices constituting a car navigation equipment are respectively expensive, so that there is a problem that a car navigation equipment itself becomes expensive.

Also, although a recording medium such as a CD-ROM or a DVD-ROM can store a large size of information (map information), it is finite, so that there is a problem that the contents of route guidance in the car navigation equipment is limited.

Further, a method of guiding a route in a conventional car navigation equipment is to guide the routeway for destination, and a variety of guiding methods in accordance with user's interest, moving purpose (e.g., sightseeing) and so on are not proposed, so that there is a problem that more abundant information can not be proposed to an user.

DISCLOSURE OF INVENTION

This invention is to solve the problems described above, and to provide an information processing apparatus, which is inexpensive and downsized, to offer the information in order to perform a variety of guidance.

To solve the above problems, according to this invention, an information processing apparatus comprises: detecting means for detecting positional information; first transmitting means for transmitting the positional information detected by the detecting means to the server; inputting means for inputting the predetermined route search conditions; second transmitting means for transmitting the route search conditions input by the inputting means to the server; receiving means for receiving guidance data transmitted from the server, the guidance data corresponding to the positional information transmitted by the first transmitting means and corresponding to the route search conditions transmitted by the second transmitting means; and output controlling means for controlling the output of the guidance data received by the receiving means.

Further, according to this invention, an information processing method comprises: detecting step of detecting positional information; first transmitting step of transmitting the positional information detected at the detecting step to the server; inputting step of inputting the predetermined route search conditions; second transmitting step of transmitting the route search conditions input at the inputting step to the server; receiving step of receiving guidance data transmitted from the server, the guidance data corresponding to the positional information transmitted at the first transmitting step and corresponding to the route search conditions transmitted at the second transmitting step; and output controlling step of controlling the output of the guidance data received at the receiving step.

Further, according to this invention, a providing medium for providing a program readable by a computer which executes processings including: detecting step of detecting positional information; first transmitting step of transmitting the positional information detected at the detecting step to the server; inputting step of inputting the predetermined route search conditions; second transmitting step of transmitting the route search conditions input at the inputting step to the server; receiving step of receiving guidance data transmitted from the server, the guidance data corresponding to the positional information transmitted at the first transmitting step and corresponding to the route search conditions transmitted at the second transmitting step; and output controlling step of controlling the output of the guidance data received at the receiving step.

As a result, according to these information processing apparatus, information processing method, and providing medium, positional information is detected; the detected position information is transmitted to a server; the predetermined route search conditions are input; the input route search conditions are transmitted to the server; guidance data which is transmitted from the server and which corresponds to the transmitted positional information and the transmitted route search conditions is received; and the output of the received guidance data is controlled, so that the information processing apparatus can be made inexpensive and downsized.

Further, according to this invention, an information processing apparatus comprises: acquiring means for acquiring positional information transmitted from the terminal; receiving means for receiving the predetermined router search conditions transmitted from the terminal; detecting means for detecting map data corresponding to the route search conditions received by the receiving means; setting means for setting guide point corresponding to the route search conditions received by the receiving means to the map data detected by the detecting means; generating means for generating guidance data to guide the guide point set by the setting means, correspondingly to the positional information acquired by the acquiring means; and transmitting means for transmitting the guidance data generated by the generating means.

Further, according to this invention, an information processing method comprises: acquiring step of acquiring positional information transmitted from the terminal; receiving step of receiving the predetermined router search conditions transmitted from the terminal; detecting step of detecting map data corresponding to the route search conditions received at the receiving step; setting step of setting guide point corresponding to the route search conditions received at the receiving step to the map data detected at the detecting step; generating step of generating guidance data to guide the guide point set at the setting step, correspondingly to the positional information acquired at the acquiring step; and transmitting step of transmitting the guidance data generated at the generating step.

Further, according to this invention, a providing medium for providing a program readable by a computer which executes processings including: acquiring step of acquiring positional information transmitted from the terminal; receiving step of receiving the predetermined router search conditions transmitted from the terminal; detecting step of detecting map data corresponding to the route search conditions received at the receiving step; setting step of setting guide point corresponding to the route search conditions received at the receiving step to the map data detected at the detecting step; generating step of generating guidance data to guide the guide point set at the setting step, correspondingly to the positional information acquired at the acquiring step; and transmitting step of transmitting the guidance data generated at the generating step.

As a result, according to these information processing apparatus, information processing method, and providing medium, the positional information transmitted from a server is acquired; the predetermined route search conditions transmitted from the server is received; map data corresponding to the received route search conditions is detected; guide point corresponding to the received route search conditions is set to the detected map data; guidance data to guide the set guide point is generated correspondingly to the acquired positional information; and the generated guidance data is transmitted, so as to execute a variety of guidance.

BEST MODE FOR CARRYING OUT THE INVENTION

Hereinafter, the embodiments of this invention will be described. In order to clear the correspondence between the respective means of this invention according to claims and the embodiment described below, adding the corresponding embodiment (one example) in parentheses after the respective means, the feature of this invention is described as follows. However, this description is not limited to the statement of respective means.

Figure 1:
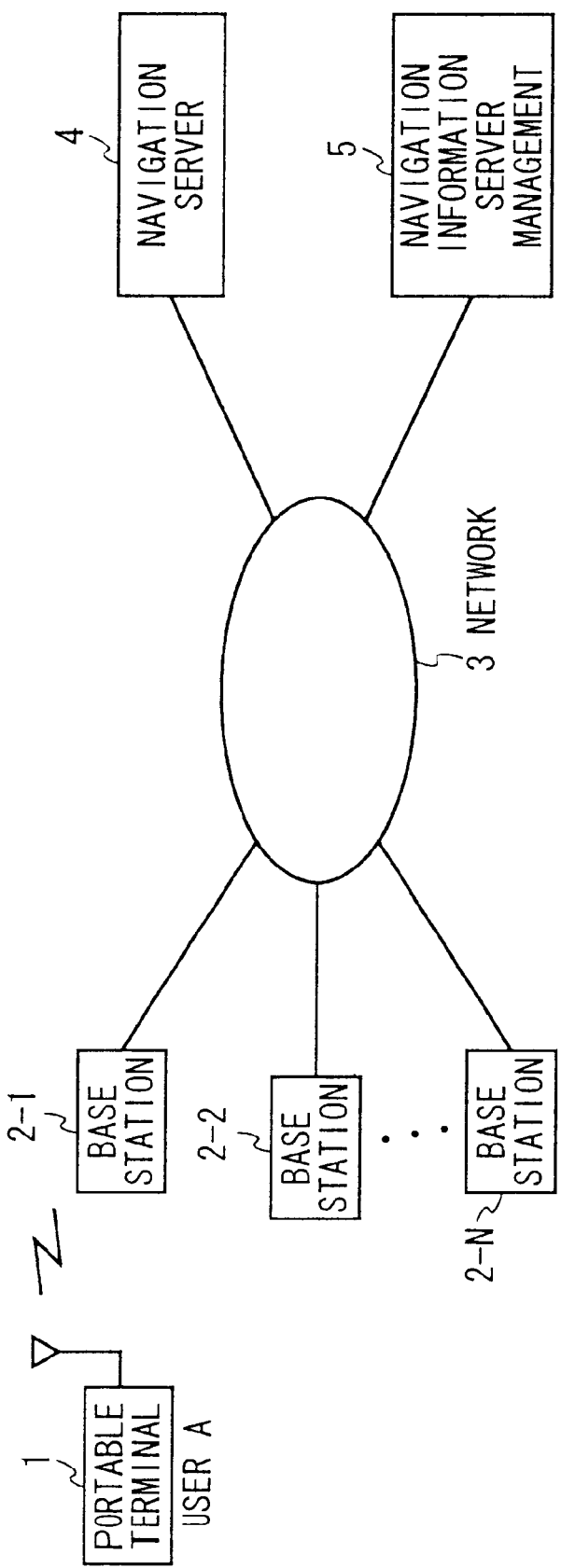
FIG. 1 is a diagram showing the construction of a navigation service providing system applying the present invention.

FIG. 1 shows the construction of a navigation service providing system to which this invention is applied. In this example, a portable terminal 1 carried by an user A communicates via radio waves with a base station 2-1 proximate to a communication route among n-base stations 2-1 to 2-N (hereinafter, referred to as base station 2 simply in a case where the base stations 2-1 to 2-N are unnecessary to tell apart), and is connected to a navigation server 4 through a network 3 to which the base station 2-1 is connected.

The base station 2 executes the connection processing between the portable terminal 1 and the network 3, and simultaneously, outputs the signal which locates itself (hereinafter, referred to as base station positional signal) by a constant period in the air. The predetermined information such as base station ID and positional information (latitude, longitude, etc.) are respectively set in the base station positional signals, and the base station positional signals which synchronize each other are respectively output from the base stations 2-1 to 2-N.

The navigation server 4 holds a predetermined navigation information (described later) and executes route search service for providing map data corresponding to route search conditions (described later) or guidance service for providing a predetermined guidance data corresponding to the position of the portable terminal 1. Note that hereinafter the route search service and the guidance service are referred to as navigation service when they are unnecessary to tell apart.

A navigation information management server 5 holds a predetermined navigation information, and as well as managing (renewing) them, supplies them to the navigation server 4 on demand.

Next, the summary of the route search service and the guidance service described above will be explained. For example, when the user A performs a predetermined operation on the portable terminal 1 to receive the route search service and inputs route search conditions such as the place where the user is now (or place of departure), destination, and moving purpose, the route search conditions are transmitted to the navigation server 4 via the base station 2-1 and the network 3.

Figure 2:
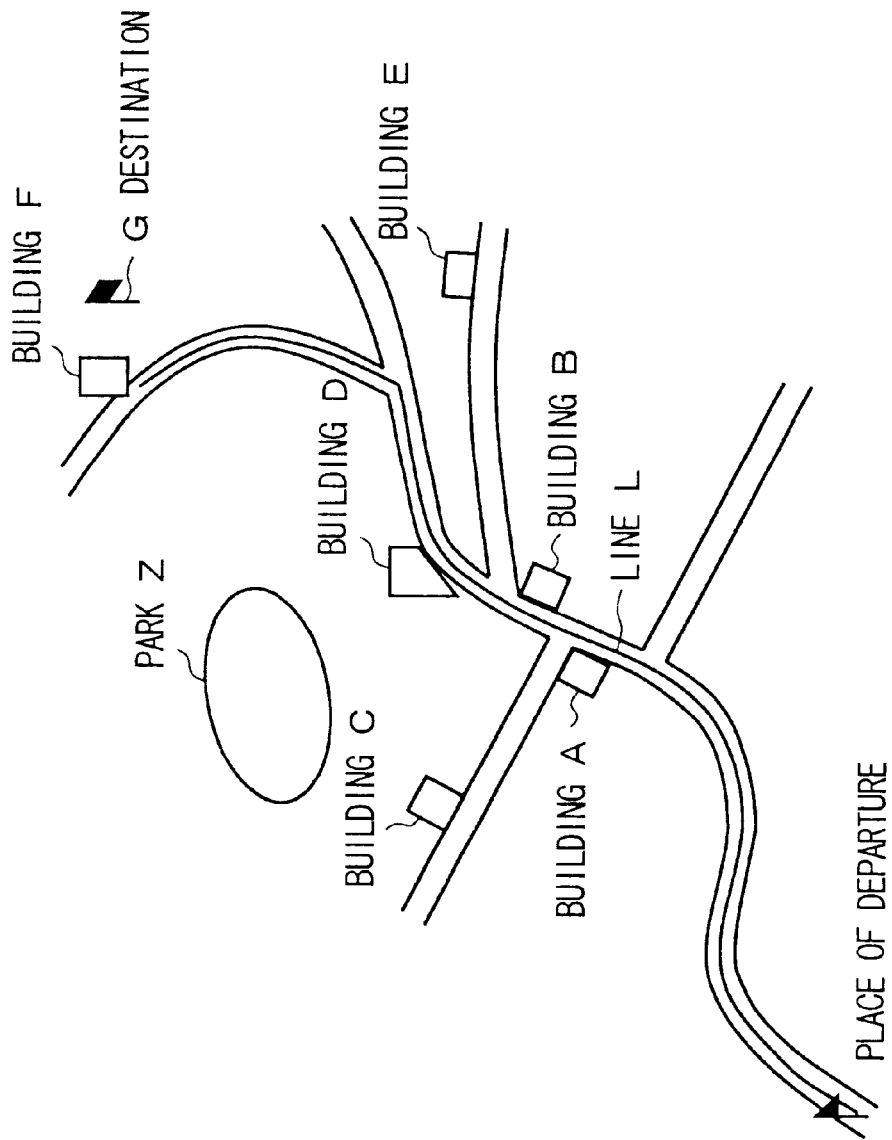
FIG. 2 is a diagram explaining the navigation service.

The map data corresponding to the route search conditions is detected and provided from the navigation server 4 to the portable terminal 1. For example, the map picture shown in FIG. 2 is displayed on a LCD 18 (FIG. 3) of the portable terminal 1. In FIG. 2, the route from the place where the user is now designated by a triangular flag to the destination designated by a square flag is shown by a line L. Thereby, the user A can grasp the route from the place of departure to the destination.

Then, the user A carries the portable terminal 1 and moves from the place where the user is now to the destination along the line L. Here, the user A performs a predetermined operation on the portable terminal 1 to receive the guidance service.

The user A moves over the road designated by the line L. When the user A approaches, for example, a building B among guide points (building B, building F, and park Z) clipped by a thick frame in the figure, within a predetermined distance, the guidance data regarding the building B is transmitted from the navigation server 4 to the portable terminal 1. In the portable terminal 1, the transmitted guidance data is received and a predetermined information is output accordingly. For example, the message or voice expressing that the user A approaches the building B is output, or the information about the building B is output. Thereby, the user A can certainly visit the guide point efficiently.

In addition, the route (the line L) and the guide points are determined on the basis of the route search conditions. For example, if it is set in the route search conditions that the moving purpose is sightseeing, the guide point is set as sight spot, and if it is set that the user has an interest in painting, the guide point is set as art museum.

Figure 3:
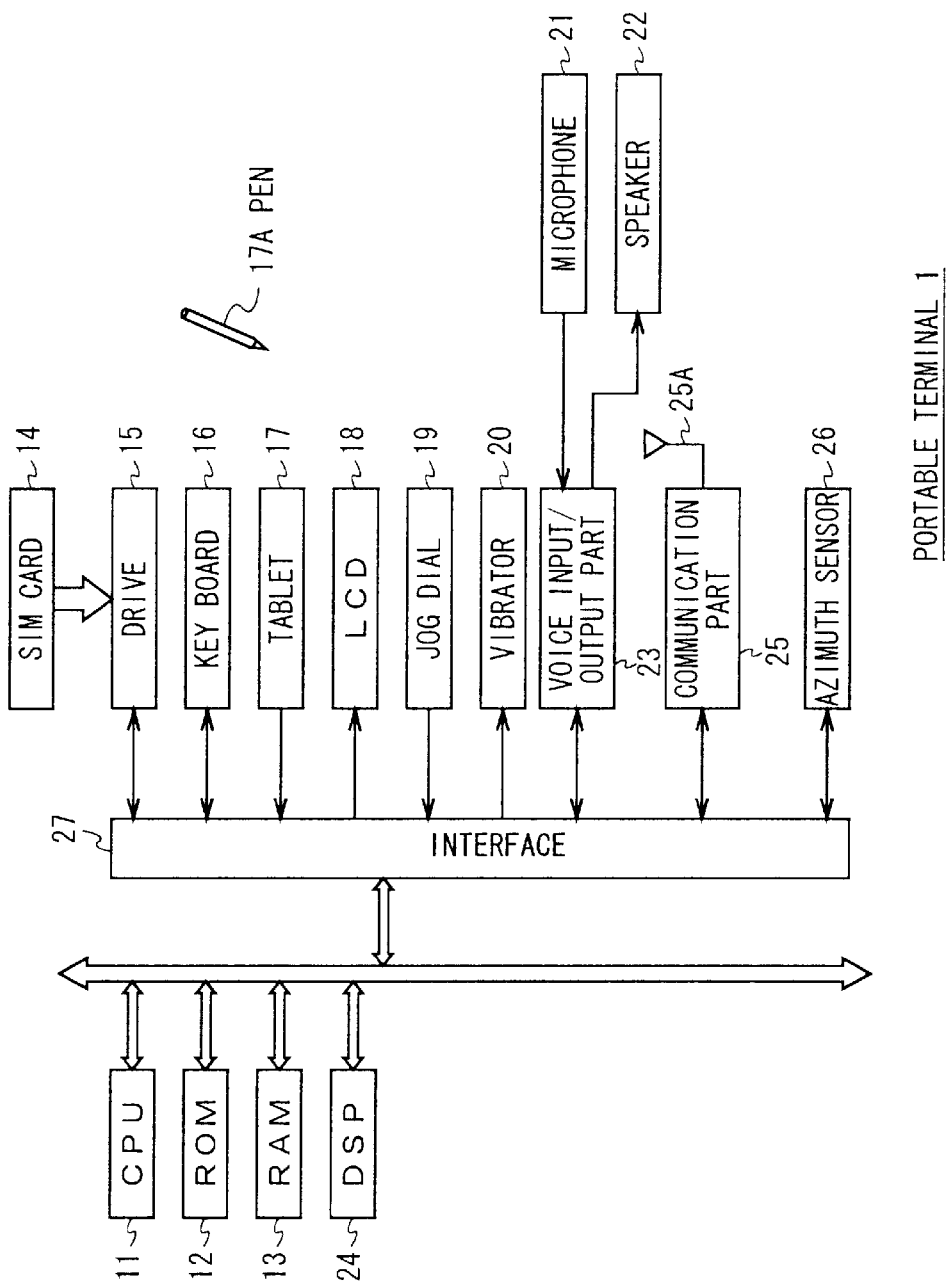
FIG. 3 is a block diagram showing the construction of a portable terminal 1 in FIG. 1.

Next, referring to FIG. 3, the construction of the portable terminal 1 will be explained. A CPU 11 executes various processings in accordance with, for example, a terminal navigation program stored in a ROM 12. Synthetic voice data is also stored in the ROM 12. A RAM 13 stores data or programs necessary to execute various processings properly.

A SIM (Subscribe Identity Module) card 14 is a recording medium which is removable from the portable terminal 1, and the user ID of user A, information indicating the type of language used by the user A (hereinafter, referred to as language information), and so on are stored therein. Note that the SIM card 14 is removable so that a plurality of users can use the portable terminal 1. A drive 15 records or reproduces information in or from the SIM card 14.

A key board 16 and a tablet 17 are operated by the user A when inputting a predetermined command to the CPU 11. In this example, the tablet 17 is provided on the display of a LCD 18, and the user A uses a pen 17A to input handwritten characters from the tablet 17. The LCD 18 displays characters, images, and images for subserving inputting in the tablet 17 (soft keys, and so on).

A jog dial 19 is operated by the user when selecting a predetermined information. A vibrator 20 vibrates the main body of the portable terminal 1, and informs the user A by this vibration that signal is received for example.

Figure 4:
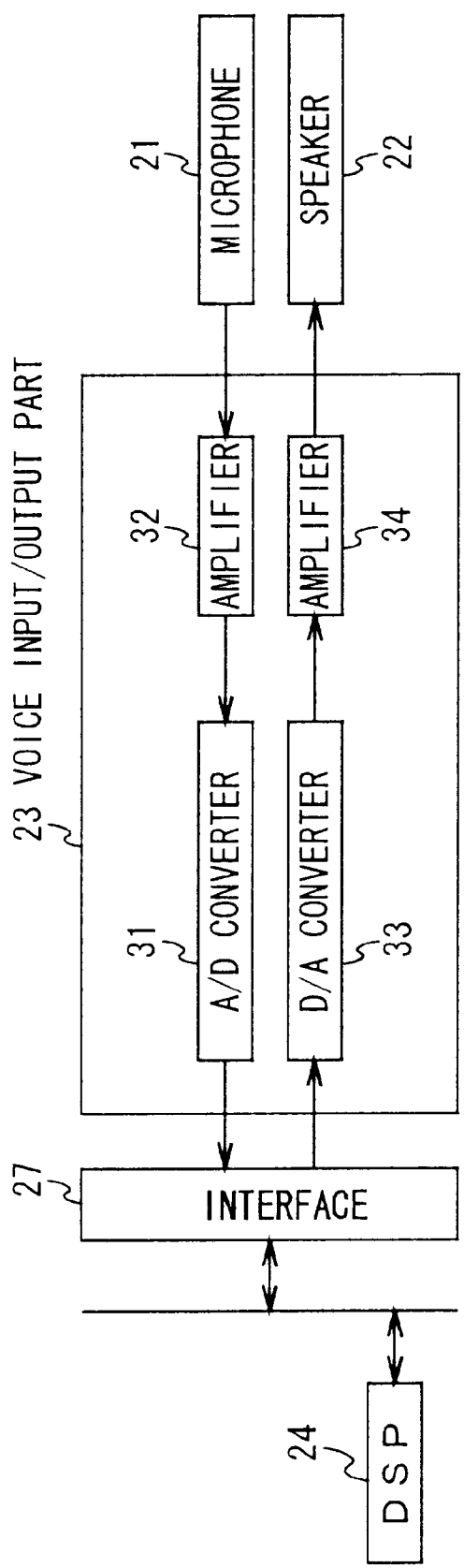
FIG. 4 is a block diagram showing the construction of a voice input/output part 23 in FIG. 3.

A voice input/output part 23 to which a microphone 21 and a speaker 22 are connected, as shown in FIG. 4, is composed of an A/D converter 31, an amplifier 32, a D/A converter 33, and an amplifier 34. The voice input/output part 23 is controlled by a DSP (Digital Signal Processor) 24. Note that the performance of the voice input/output part 23 will be described in detail later.

Returning to FIG. 3, a communication part 25 is composed of baseband circuits and RF circuits, and transmits and receives signals to and from the base station 2 via an antenna 25A. An azimuth sensor 26 detects earth magnetism to detect the direction of the portable terminal 1 (the direction that a predetermined plane of the portable terminal 1 orientates). An interface 27 is arranged between the drive 15 to the azimuth sensor 26 and the CPU 11 to the DSP 24, and executes the interface processing.

Figure 5:
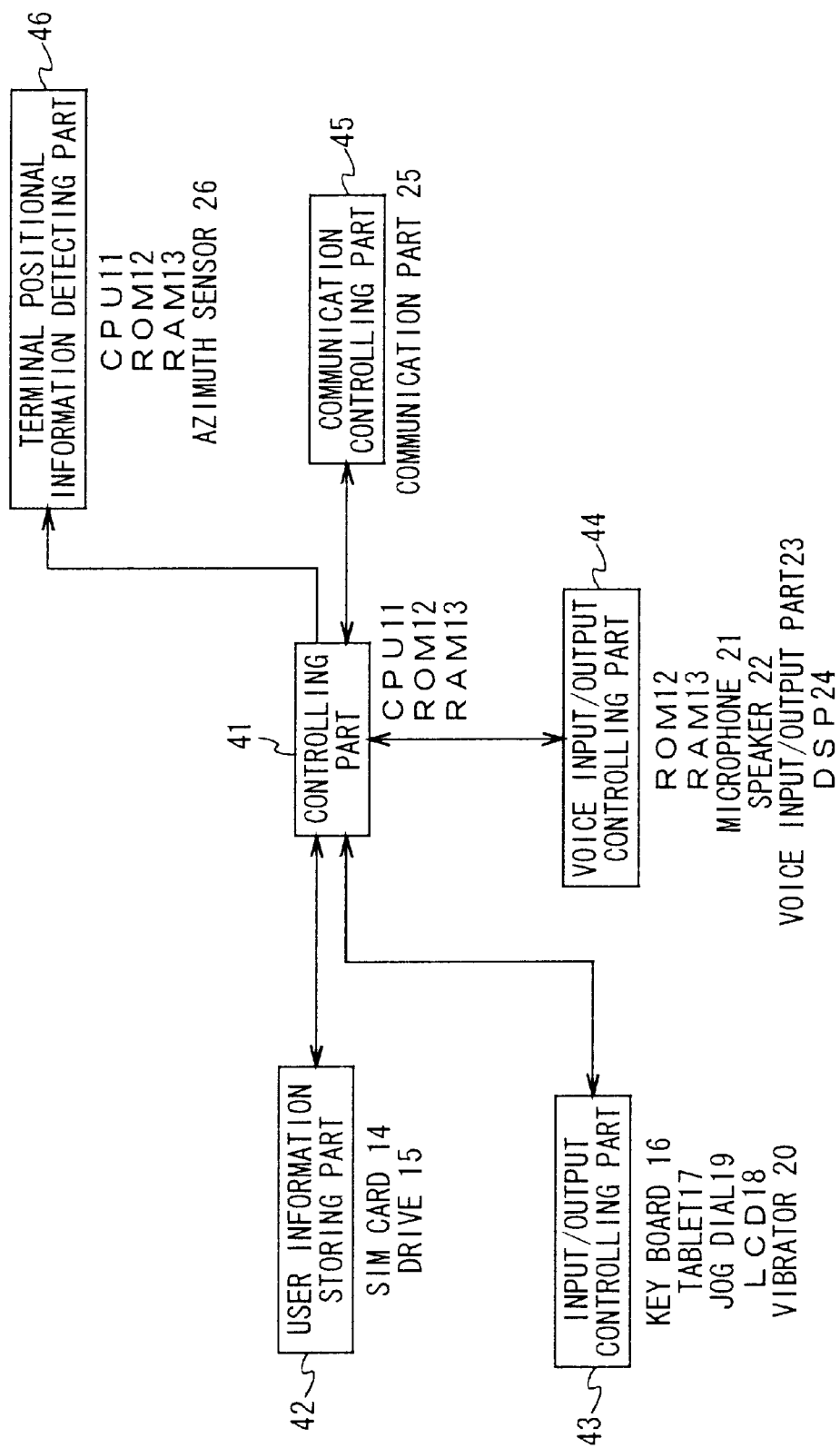
FIG. 5 is a block diagram showing the functional construction of a portable terminal 1 in FIG. 1.

FIG. 5 shows an example of the functional construction of the terminal navigation program in the portable terminal 1. A controlling part 41 controls respective parts. An user information storing part 42 stores the user ID and the language information. An input/output controlling part 43 controls the input from the key board 16, the tablet 17, and the jog dial 19, and controls the output to the LCD 18 and the vibrator 20.

A voice input/output controlling part 44 controls the input from the microphone 21, and controls the output to the speaker 22.

A communication controlling part 45 controls the communication with the base station 2. A terminal positional information detecting part 46 detects the position and aspect of the portable terminal 1.

As shown in FIG. 5, the controlling part 41 is composed of the CPU 11, the ROM 12, and the RAM 13, the user information storing part 42 is composed of the SIM card 14 and the drive 15, and the input/output controlling part 43 is composed of the key board 16, the tablet 17, the jog dial 19, the LCD 18, and the vibrator 20.

Also, the voice input/output controlling part 44 is composed of the ROM 12, the RAM 13, the microphone 21, the speaker 22, the voice input/output part 23, and the DSP 24. The communication controlling part 45 is composed of the communication part 24. The terminal positional information detecting part 46 is composed of the CPU 11, the ROM 2, the RAM 13, and the azimuth sensor 26.

Figure 6:
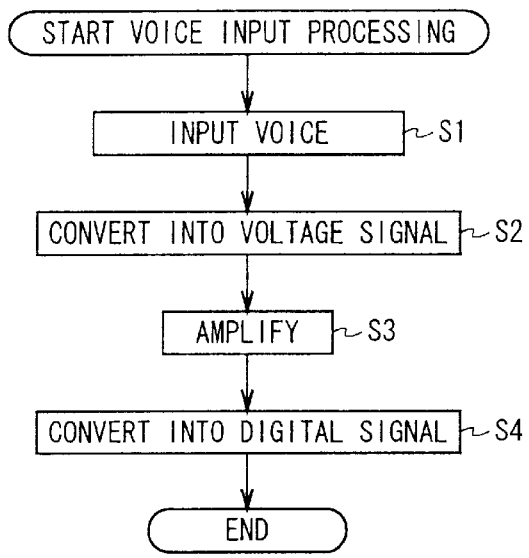
FIG. 6 is a flowchart explaining the procedure of the portable terminal 1 when the voice input processing is executed.

Next, the procedure in the portable terminal 1 when a voice is input will be explained referring to the flowchart of FIG. 6. When the voice of the user A is input from the microphone 21 at step S1, the microphone 21 converts the input voice into a voltage signal and outputs it to the amplifier 32 at step S2.

At step S3, the amplifier 32 amplifies the voltage signal output from the microphone 21, and outputs it to the A/D converter 31. At step S4, the A/D converter 31 PCM (Pulse Code Modulation)-converts the signal output from the amplifier 32 into a digital signal, and outputs it to the DSP 24.

By the way, in this example, after the voice input from the microphone 21 is converted into a voice signal as described above, it is transmitted to the navigation server 4 where it is voice-recognized. The DSP 24 performs a predetermined sound analysis on the digital voice signal from the A/D converter 31 so that the CPU 11 can recognize the voice, and the result of voice recognition by the CPU 11 can be transmitted to the navigation server 4. Moreover, the result of sound analysis by the DSP 24 is transmitted to the navigation server 4, and the result of sound analysis can be used to recognize the voice in the navigation server 4.

Figure 7:
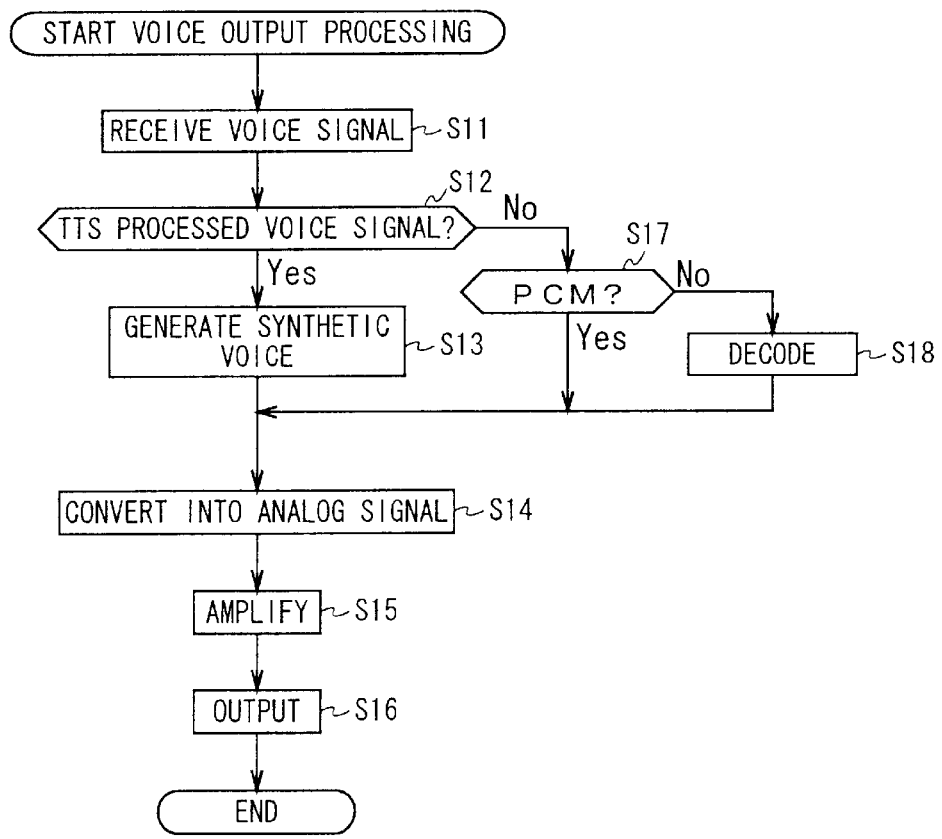
FIG. 7 is a flowchart explaining the procedure of the portable terminal 1 when the voice output processing is executed.

Next, the procedure in the portable terminal 1 when a voice is output will be explained referring to the flowchart of FIG. 7. When a synthetic voice signal is received by the communication part 25 at step S11, the DSP 24 determines whether or not the received synthetic voice signal is a TTS-processed voice signal (step S311 of FIG. 8 described later) at step SP12. When it is determined as a TTS processing voice signal, a processing proceeds to step S13.

At step SP13, the DSP 24 reads the synthetic voice data stored in the ROM 12 for example, and generates a synthetic voice according to the synthetic voice data read and the voice signal received so as to output it to the D/A converter 33.

At step S14, the D/A converter 33 converts the voice signal from the DSP 24 into an analog signal, and outputs it to the amplifier 34. At step S15, the amplifier 34 amplifies the analog signal from the D/A converter 33. At step S16, the signal amplified by the amplifier 34 is output from the speaker 22.

At step S12, when it is determined that the voice signal received at step S11 is not a TTS-processed voice signal, a processing proceeds to step S17. At step S17, the DSP 24 determines whether or not the voice signal is a PCM-processed signal, and when it is determined as a PCM-processed signal, skips the processing at step S13 and proceeds to step S14.

At step S17, when it is determined that the voice signal is not a PCM-processed signal, a processing proceeds to step S18. At step S18, the signal received at step S11 is determined as a voice signal encoded by an ADPCM, etc., to be decoded itself and then proceeds to step S14.

Figure 8:
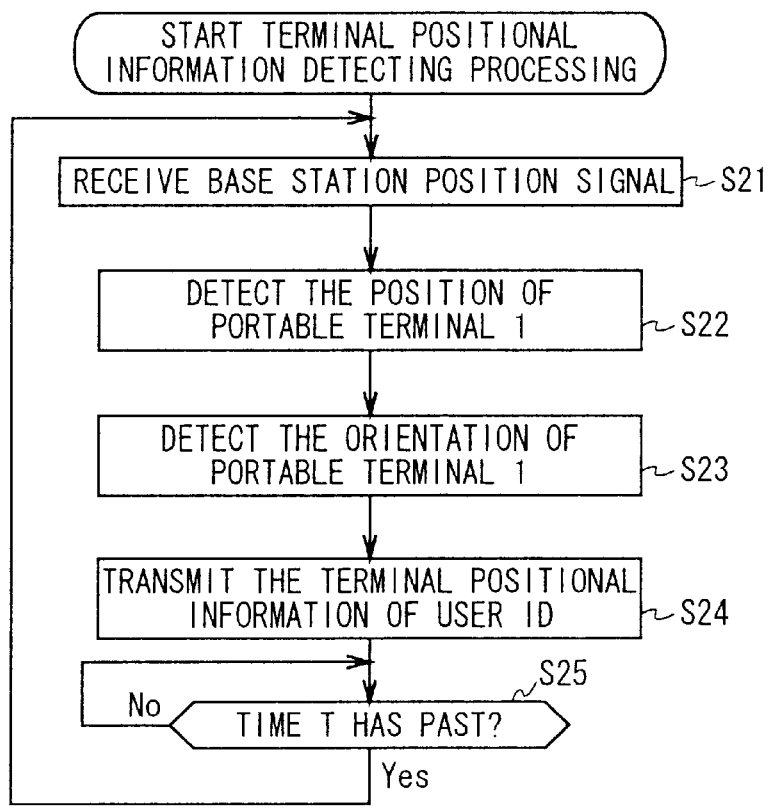
FIG. 8 is a flowchart explaining the procedure of the portable terminal 1 when the terminal positional information detection processing is executed.

Next, the procedure in the terminal positional information detecting part 46 of the portable terminal 1 when the terminal positional information detecting processing is executed will be explained referring to the flowchart of FIG. 8. At step S21, the terminal positional information detecting part 46 controls the communication controlling part 45 to receive a base station position signal transmitted from the base stations 2-1 to 2-N. Note that in this case, the base station position signal from the base station 2 positioned within a predetermined area (within the limits) where the portable terminal 1 exists is received by the communication controlling part 45.

At step S22, the terminal positional information detecting part 46 reads the base station ID and the positional information (latitude, longitude, etc.) from the base station position signal received by the communication controlling part 45 respectively, and executes the processing such as detecting the position of the base station 2 from which the signal is transmitted and calculating the arrival time difference of the base station position signal, so as to detect the position (e.g., latitude and longitude) of the portable terminal 1.

Next, at step S23, the terminal positional information detecting part 46 detects earth magnetism from the azimuth sensor 26, and detects the aspect of the portable terminal 1 (the direction that the predetermined side of the portable terminal 1 orientates) on the basis of the detected result.

At step S24, the terminal positional information detecting part 46 controls the communication controlling part 45 to transmit the position of the portable terminal 1 detected at step S22 and the direction detected at step S23 to the navigation server 4 together with the user ID obtained from the SIM card 14. Note that if the position of the portable terminal 1 detected at step S22 and the direction detected at step S23 are unnecessary to tell apart, these are collectively referred to as terminal positional information hereinafter.).

Next, at step S25, the terminal positional information detecting part 46 waits for a predetermined time T, and after the time T has past over, a processing returns to step S21 where subsequent processings are performed. That is, for the period T, the terminal positional information of the portable terminal 1 is detected and is transmitted to the navigation server 4.

Note that at step S22, the terminal positional information of the portable terminal 1 can be also detected in succession for a predetermined time so as to detect the movement information of the portable terminal 1.

Further, a GPS receiving circuit and a GPS antenna can be provided additionally to detect the position of the portable terminal 1 by the GPS and the DGPS. The cell number in PHS can be used or another portable terminal that the present place is known can be used to detect the position of the portable terminal 1. Moreover, the position of the portable terminal 1 can be also detected, on the basis of the exact positional information which is input by an user, such as the address.

Figure 9:
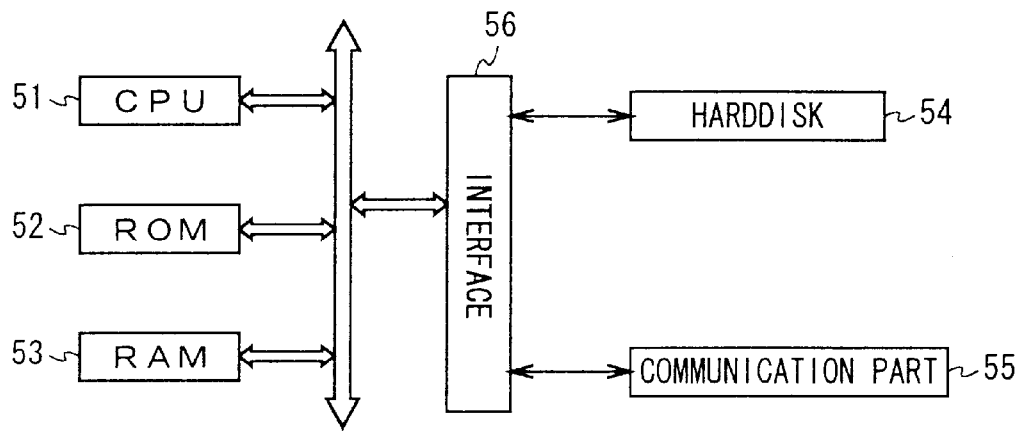
FIG. 9 is a block diagram showing the construction of a navigation server 4 in FIG. 1.

FIG. 9 shows the construction of the navigation server 4. A CPU 51 executes various processings in accordance with the programs stored in a ROM 52 or a hard disk 54. A RAM 53 temporarily stores data or programs when the processing is executed by the CPU 51.

The hard disk 54 holds navigation information in addition to a server navigation program. Note that an optical disc or a magneto-optical disk can be provided instead of the hard disk 54. Also, a plurality of such recording media can be provided.

A communication part 55 is connected to the network 3, and receives a signal for the navigation server 4 and outputs a signal an interface 56 is arranged between the hard disk 54 or the communication part 55 and the CPU 51, and executes the interface processing.

Figure 10:
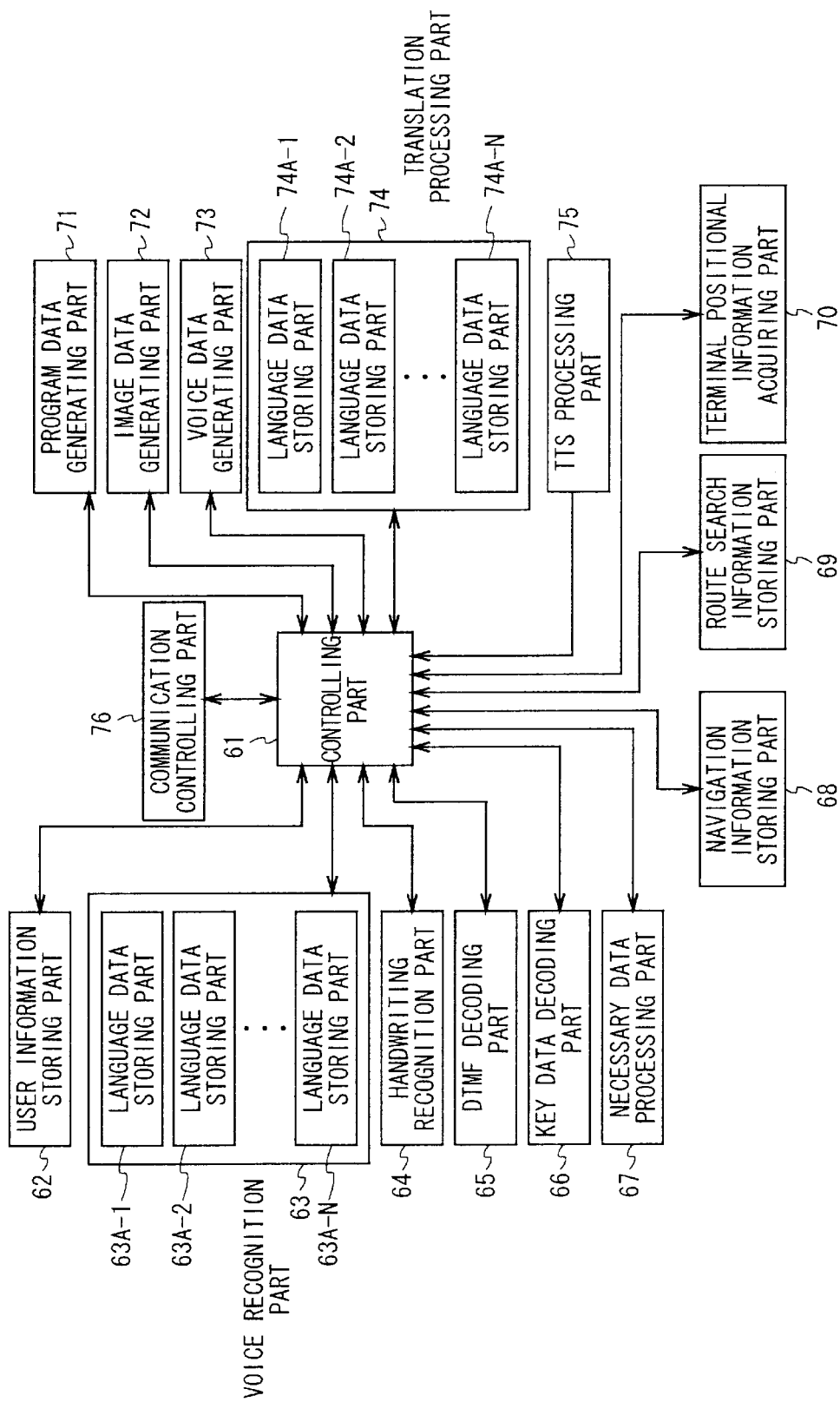
FIG. 10 is a block diagram showing the functional construction of a navigation server 4 in FIG. 1.

FIG. 10 shows the functional construction of the server navigation program of the navigation server 4. A controlling part 61 controls respective parts. A user information storing part 62 stores the user ID, language information, and so on.

A voice recognition part 63 has N-language data storing parts 63A-1 to 63A–N in which the voice recognition language data of proper names used in the predetermined areas are respectively stored, and refers one language data storing part 63A among them to recognize the supplied voice signal. Then, the voice recognition part 63 generates corresponding text data.

In this example, the voice recognition language data of proper names used in Japan (Tokyo), such as "Tokyo Tower", "Imperial Palace", and "Capitol Hill" are stored in the language data storing part 63A-1. Also, the voice recognition language data of proper names used in U.S.A. (New York), such as "Statue of Liberty" and "Empire State Building" are stored in the language data storing part 63A-2. The voice recognition language data of proper names used in a predetermined area are respectively stored in the language data storing parts 63A-3 to 63A–N same as the language data storing parts 63A-1 and 63A-2.

A handwriting recognition part 64 recognizes the characters of the supplied handwriting data to generate corresponding text data.

A DTMF decoding part 65 decodes the supplied DTMF tone data. A key data decoding part 66 decodes key data. A necessary data processing part 67 performs a predetermined processing on the supplied necessary data (described later), and the controlling part 61 converts it into the readable data.

In a navigation information storing part 68, the information necessary for the route search processing and the guidance processing described later, such as traffic information, accommodation information, public facility information, travel guide information, in addition to the map information (hereinafter, these are collectively referred to as navigation information if these are unnecessary to tell apart.) are stored. Also, the limit of time (expiration date) is set to each of the navigation information.

A route search information storing part 69 stores the route search conditions (described later) and the map data which is the result of route search. A terminal positional information acquiring part 70 controls the processing for acquiring the supplied terminal positional information.

A program data generating part 71 generates program data. An image data generating part 72 generates image data. A voice data generating part 73 generates voice data.

A translation processing part 74 has N-language data storing parts 74A-1 to 74A–N which stores the voice recognition language data of the proper names used in a predetermined area respectively, and refers one of them so as to convert (translate) the supplied text data into the text data which corresponds to other language.

In this example, the translation language data of proper names used in Japan (Tokyo), such as "Tokyo Tower", "Imperial Palace", and "Capitol Hill" are stored in the language data storing part 74A-1. Also, the translation language data of proper names used in U.S.A. (New York), such as "Statue of Liberty" and "Empire State Building" are stored in the language data storing part 74A-2. The translation language data of proper names used in a predetermined area are respectively stored in the language data storing parts 74A-3 to 74A–N same as the language data storing parts 74A-1 and 74A-2.

A TTS (Text to Speech) processing part 75 generates synthetic voice data on the basis of the supplied text data.

A communication controlling part 76 controls the processing for transmitting and receiving data.

Next, the procedure in the navigation server 4 when data is received will be explained referring to the flowchart of FIG. 11.

Figure 12:
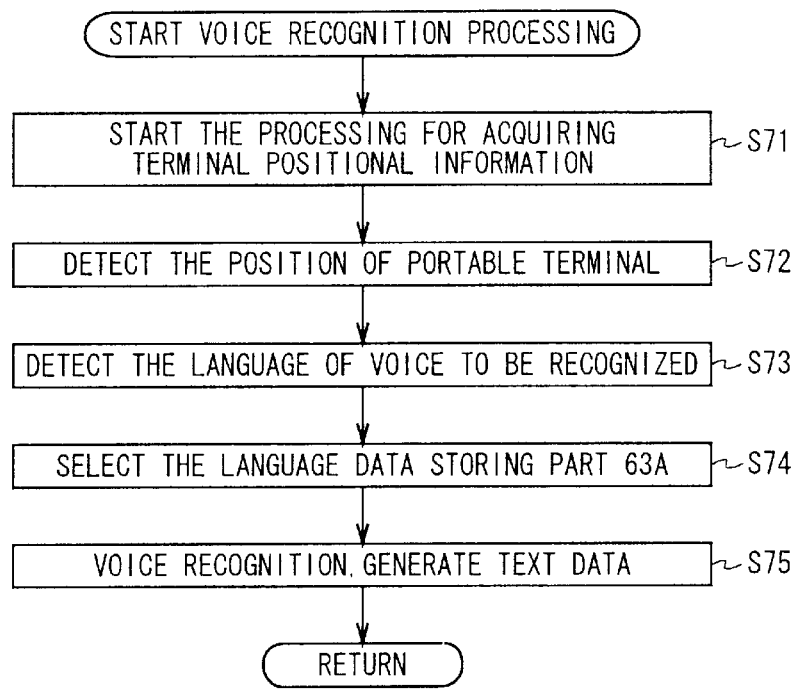
FIG. 12 is a flowchart explaining the procedure of the navigation server 4 when the voice recognition processing is executed.

When data is received by the communication controlling part 76 at step S51, the controlling part 61 determines whether or not the received data is voice signal at step S52. If the data is determined as the voice signal, a voice recognition processing starts at step S53. The details of the voice recognition processing at step S53 is shown in the flowchart of FIG. 12.

More specifically, at step S71, the controlling part 61 controls the terminal positional information acquiring part 70 to execute the processing for receiving the terminal positional information including the user ID transmitted from the portable terminal 1 at a period T. Thereby, the terminal positional information acquiring part 70 receives the terminal positional information transmitted from the portable terminal 1 through the communication controlling part 76, and gives notice to the controlling part 61.

At step S72, the controlling part 61 detects the position of the portable terminal 1 based on the terminal positional information notified from the terminal positional information acquiring part 70, and gives notice to the voice recognition part 63.

Next, at step S73, the controlling part 61 refers the language information stored in the user information storing part 62 to detect the type of the language of voice (words) to be recognized (language used by the user A), and gives notice to the voice recognition part 63.

At step S74, the voice recognition part 63 selects the language data storing part 63A corresponding to the position (area) of the portable terminal 1 notified at step S72. For example, if the position notified is Japanese domain, the language data storing part 63A-1 is selected. If the position notified is U.S.A. domain, the language data storing part 63A-2 is selected.

Next, at step S75, the voice recognition part 63 refers the voice recognition language data, which is the type of the language notified at step S73, of the language data storing part 63A selected at step S74 to recognize the voice signal received at step S52, and generates corresponding text data. Then, a processing terminates and returns to FIG. 11.

At step S52, if it is determined that the data received at step S51 is not voice signal, a processing proceeds to step S54. At step S54, the controlling part 61 determines whether or not the received data is handwriting data, and if it is determined as handwriting data, a processing proceeds to step S55. At step S55, the controlling part 61 controls the handwriting recognition part 64 to recognize the handwriting data received at step S51 and generate corresponding text data.

At step S54, if it is determined that the data received at step S51 is not handwriting data, a processing proceeds to step S56. At step S56, the controlling part 61 determines whether or not the received data is DTMF tone data, and if it is determined as DTMF tone data, a processing proceeds to step S57. At step S57, the controlling part 61 controls the DTMF decoding part 65 to decode the DTMF tone data received at step S51.

At step S56, if it is determined that the data received at step S51 is not DTMF tone data, a processing proceeds to step S58. At step S58, the controlling part 61 determines whether or not the received data is key data (e.g., data corresponding to the key operation of the key board 16 in the portable terminal 1), and if it is determined as key data, a processing proceeds to step S59. At step S59, the controlling part 61 controls the key data decoding part 66 to decode the key data received at step S51.

At step S58, if it is determined that the data received at step S51 is not key data, a processing proceeds to step S60. At step S60, the controlling part 61 determines whether or not the received data is data necessary to execute the route search processing and the guidance processing (hereinafter, referred to as necessary data)(including control signal), for example, the terminal positional information, and if it is determined as necessary data, a processing proceeds to step S61. At step S61, the controlling part 61 controls the necessary data processing part 67 to perform a predetermined processing on the necessary data received at step S51.

After the processings at steps S53, S55, S57, S59, S61 are performed, a processing terminates. The data received at step S51 and processed at each step is supplied to the controlling part 61. Also, at step S60, if it is determined that the data received at step S51 is not necessary data, the received data is decided as text data, and a processing terminates without any processings. The text data received at step S51 is supplied to the controlling part 61 as it is.

In this way, the processing corresponding to the type of data is performed, so that the controlling part 61 can recognize the input data.

Figure 13:
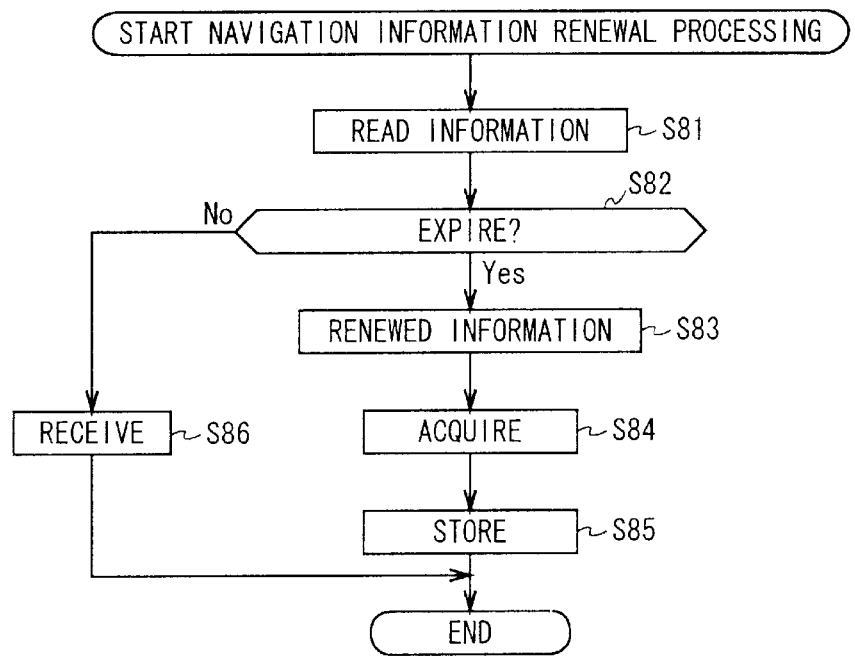
FIG. 13 is a flowchart explaining the procedure of the navigation server 4 when the navigation information renewal processing is executed.

Next, the procedure in the navigation server 4 when the navigation information stored in the navigation information storing part 68 is renewed will be explained referring to the flowchart of FIG. 13.

The controlling part 61 reads a predetermined navigation information from the navigation information storing part 68 at step S81, for example, as one step of some kind of processing so as to detect the expiration date of the read navigation information, and determines whether or not the navigation information expires at step S82. If it is determined that the navigation information expires, a processing proceeds to step S83.

At step S83, the controlling part 61 controls the communication controlling part 76 to have access to the navigation information management server 5 and to receive the navigation information that the expiration data is renewed. Next, at step S84, the controlling part 61 acquires the navigation information received at step S83, and at step S85, stores it in the navigation information storing part 68 in place of the navigation information read at step S81 that the expiration date expires.

On the other hand, if it is at step S82 determined that the navigation information does not expire, the controlling part 61 at step S86 acquires the navigation information read at step S81, and terminates a processing.

In this way, the expiration date of the navigation information stored in the navigation information storing part 68 is verified whenever it is read by the controlling part 61, and is renewed as necessary.

Figure 14:
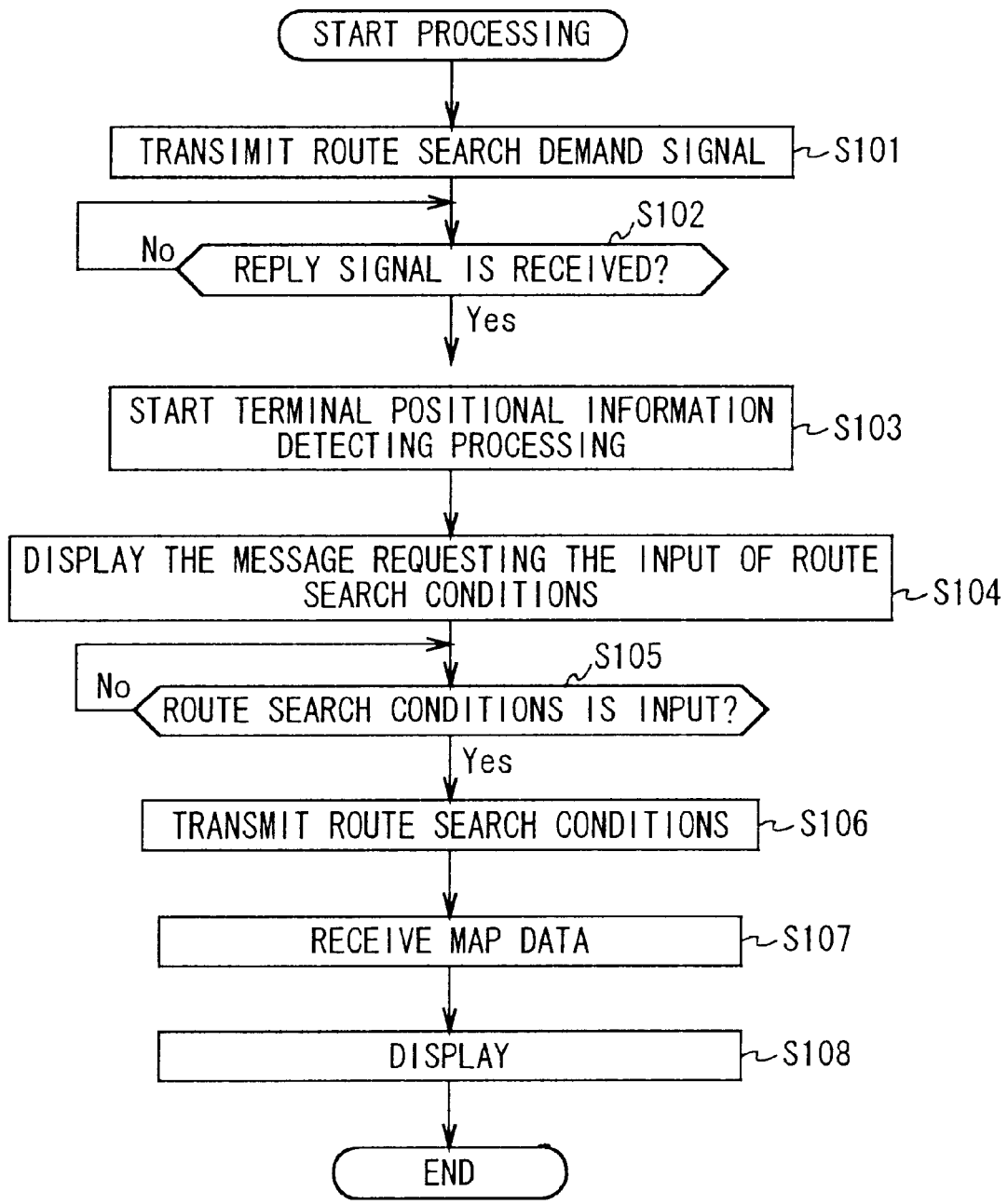
FIG. 14 is a flowchart explaining the procedure of the portable terminal 1 when the map data proposed is received.

Next, the procedure in the portable terminal 1 when the route search service provided is taken will be explained referring to FIG. 14. Note that the procedure in the navigation server 4 corresponding to the procedure in the portable terminal 1 will be described later.

In the state that the terminal navigation program starts in the portable terminal 1, when the operation for receiving the route search service provided is performed by the user A, for example on the key board 16, the controlling part 41, at step S101, reads the user ID and the language information from the user information storing part 42, and adds them to the signal for demanding route search (hereinafter, referred to as route search demand signal) to transmit it to the navigation server 4 through the base station 2 (in this example, the base station 2-1) by controlling the communication controlling part 45.

At step S102, the controlling part 41 waits until a reply signal to the route search demand signal from the navigation server 4 is received by the communication part 45. When the reply signal is received, the controlling part 41 controls the terminal positional information detecting part 46 at step S103 to start the terminal positional information detecting processing. Since the terminal positional information detecting processing at step S103 has been already explained referring the flowchart of FIG. 8, the details are omitted here, but thereby the terminal positional information of the portable terminal 1 is detected at a period T and transmitted to the navigation server 4.

Next, at step S104, the controlling part 41 controls the input/output controlling part 43 to display the message for requesting the input of route search conditions on the LCD 18, and controls the voice input/output controlling part 44 to output (show) by voice to the user A the message displayed on the LCD 18 through the speaker 22.

At step S105, the controlling part 41 waits until the route search conditions are input from the input/output controlling part 43 or the voice input/output controlling part 44. When the route search conditions are input, a processing proceeds to step S106 where the controlling part 41 controls the communication controlling part 45 to transmit the input route search conditions to the navigation server 4.

In this example, the user A operates the key board 16 to input, uses the pen 17A to input with handwriting from the tablet 17, or uses the microphone 21 to input by voice the route search conditions. Note that hereinafter, if these operations for inputting data to the portable terminal 1 are unnecessary to tell apart, it is collectively referred to as data input operation.

Further, the example of the route search conditions input here is shown as follows. Note that in this example, the route search conditions are: place where the user is now and destination; moving purpose is sightseeing; and translation is needed, and these are input by the data input operation to the portable terminal 1.

place where the user is now (or place of departure) and destination moving purpose (e.g., sightseeing or business)

moving conditions (e.g., route when necessary time is short, safe route, route for shortest distance, or time for sightseeing)

hobby (e.g., sports or movie)

whether or not translation is necessary

Next, at step S107, the controlling part 41 controls the communication controlling part 45 to receive map data (map data corresponding to the route search conditions) transmitted from the navigation server 4, and at step S108 controls the input/output controlling part 43 to display it on the LCD 18. Thereby, the map as shown in FIG. 2 is displayed on the LCD 18.

Figure 15:
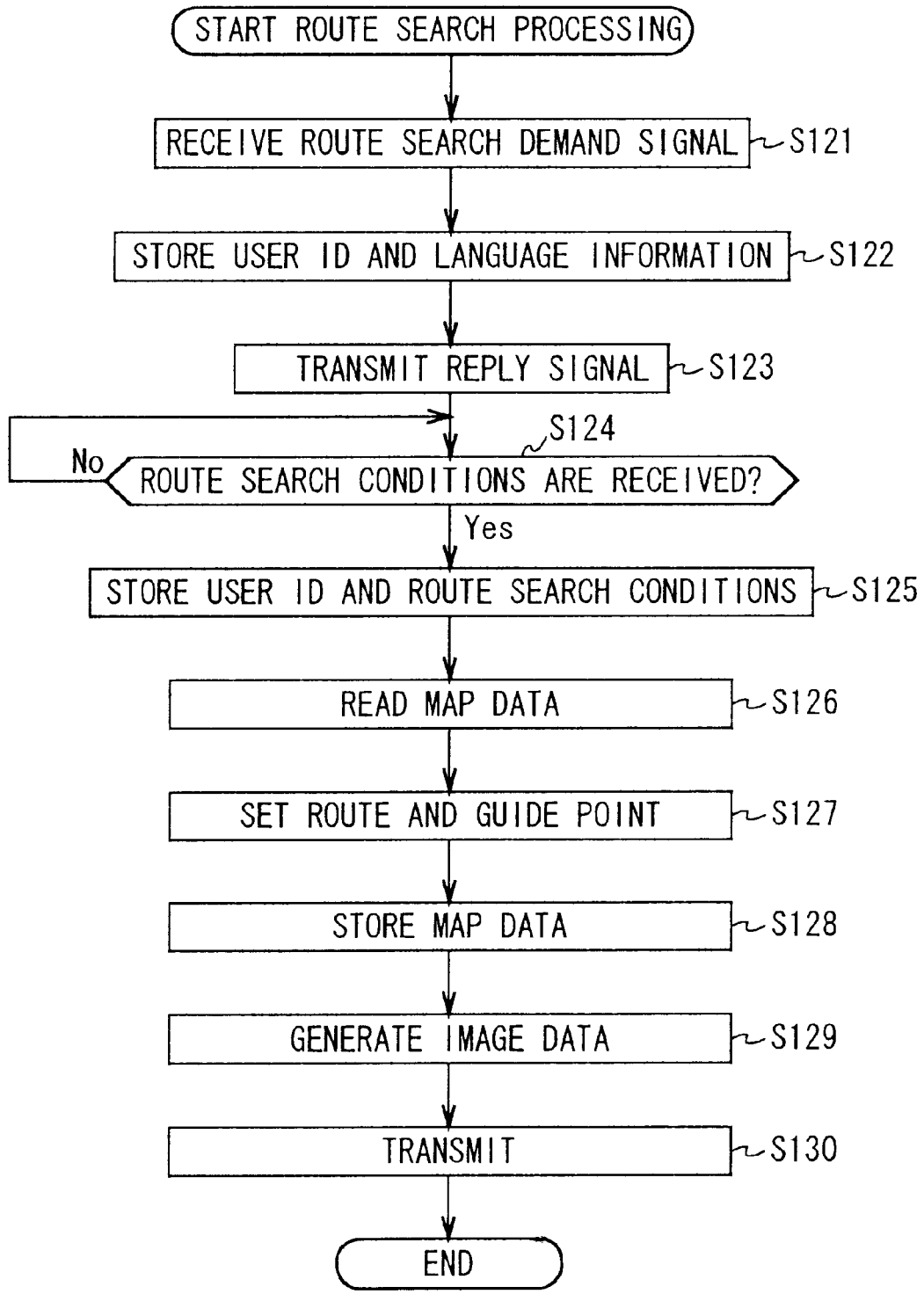
FIG. 15 is a flowchart explaining the procedure of the navigation server 4 when the route search processing is executed.

Next, correspondingly to the procedure in the portable terminal 1 explained in the flowchart of FIG. 14, the procedure in the navigation server 4 when the processing for providing map data (route search processing) to the portable terminal 1 is executed will be explained referring to the flowchart of FIG. 15.

In the state that the server navigation program held in the hard disk 54 starts up, at step S121, the controlling part 61 of the navigation server 4 controls the communication controlling part 76 to receive the route search demand signal transmitted from the portable terminal 1. When a signal is received by the communication controlling part 76, the processing explained in the flowchart of FIG. 11 is actually executed (in this case, the processing at step S61 is executed), so that the controlling part 61 grasps that a signal received at step S121 is route search demand signal.

At step S122, the controlling part 61 reads the user ID and the language information added to the route search demand signal to store it in the user information storing part 62. At step S123, the controlling part 61 controls the communication controlling part 76 to transmit the reply signal of the route search demand signal to the portable terminal 1.

At step S124, the controlling part 61 waits until the route search conditions transmitted from the portable: terminal 1 is received by the communication controlling part 76, and when the route search conditions are received, a processing proceeds to step S125.

Figure 11:
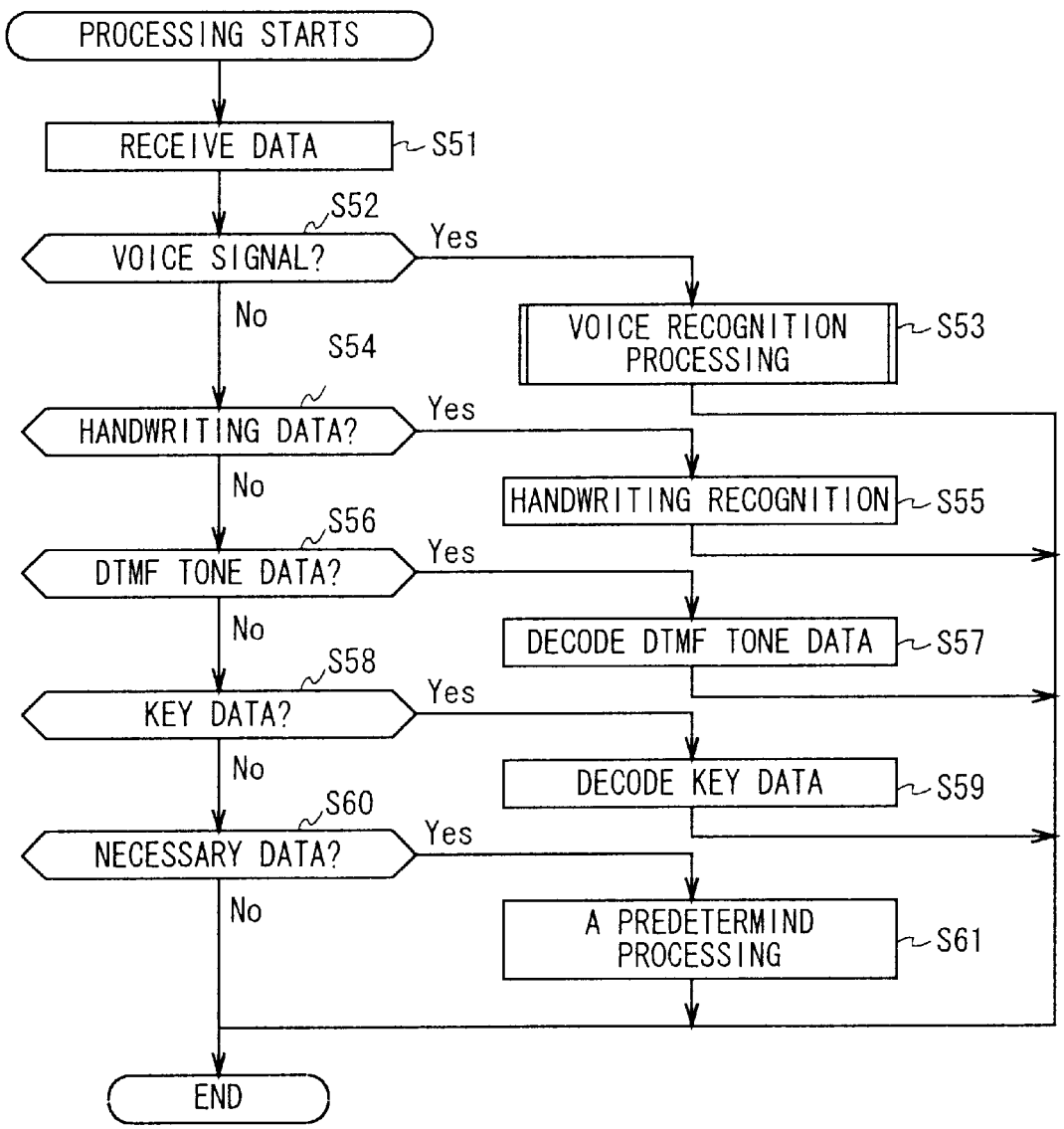
FIG. 11 is a flowchart explaining the procedure of the navigation server 4 when the data input processing is executed.

In this case also, when the route search conditions from the portable terminal 1 is received at step S124, the processing explained in the flowchart of FIG. 11 is executed, so that the controlling part 61 grasps that the data received at step S124 is route search conditions.

For example, in the case that the route search conditions are input from the microphone 21 by voice in the portable terminal 1, the voice recognition processing at step S53 of FIG. 11 is executed. Also, the route search conditions are input from the tablet 17 with handwriting, the handwriting recognition processing at step S55 is executed.

Next, at step S125, the controlling part 61 stores the route search conditions received at step S124 in the route search information storing part 69 together with the user ID stored at step S122, and reads the map data corresponding to the route search conditions from the navigation information storing part 68 at step S126. At this time, the controlling part 61 executes the processing explained in the flowchart of FIG. 11. For example, the controlling part 61 confirms the expiration date of the read navigation information (in this case, the map data), and if it expires, acquires the navigation information that the expiration date is renewed from the navigation information management server 5.

At step S127, the controlling part 61 refers the route search conditions stored in the route search information storing part 69, and sets a route and a guide point on the map data read at step S126. In this example, since the user's purpose is sightseeing, sight spot is set as the guide point. In the example of FIG. 2, the building B, the building F, and the park Z are set as the guide points.

At step S128, the controlling part 61 stores in the route search information storing part 69 the map data in which the route and the guide point are set together with the user ID stored at step S122.

Next, at step S129, the controlling part 61 controls the image data generating part 72 to generate image data based on the map data in which the guide point is set at step S127. At step S130, the controlling part 61 controls the communication controlling part 76 to transmit the image data generated at step S129 to the portable terminal 1. Then, a processing terminates.

Figure 16:
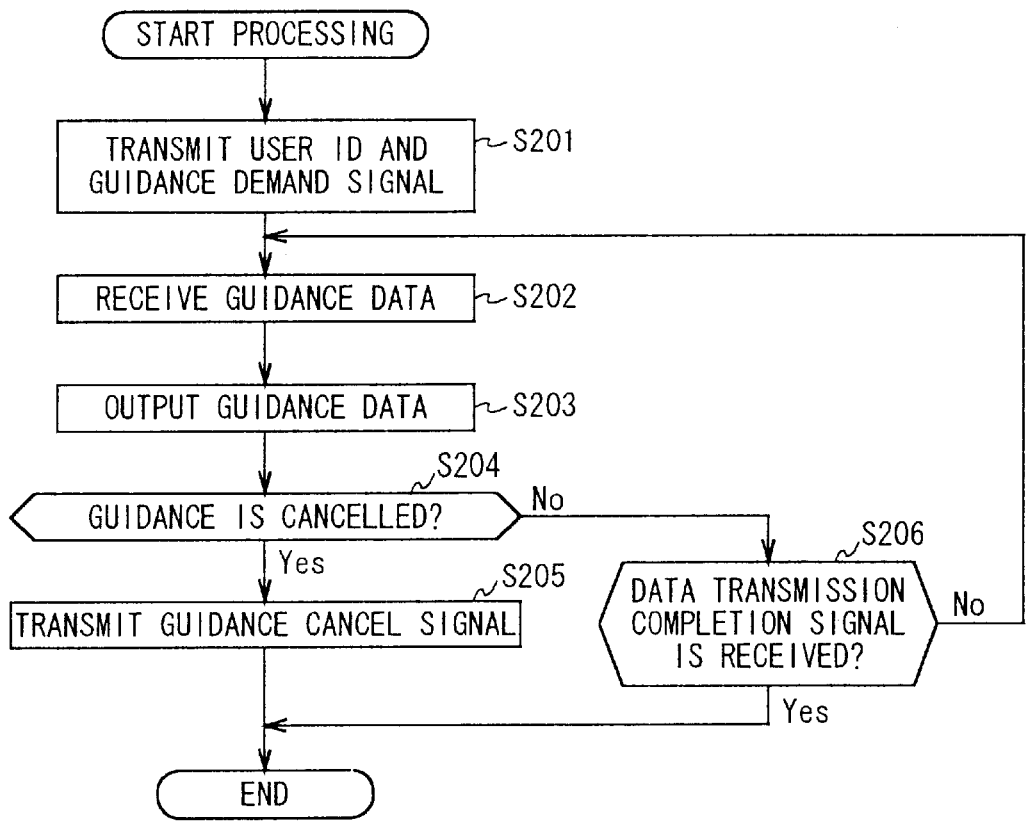
FIG. 16 is a flowchart explaining the procedure of the portable terminal 1 when the processing for receiving guidance data is executed.

Next, the procedure in the portable terminal 1 when the guidance service provided is received will be explained referring to FIG. 16. Note that the procedure in the navigation server 4 corresponding to this procedure in the portable terminal 1 will be described later.

In the state that the map shown in FIG. 2 is displayed on the LCD 18 of the portable terminal 1, when the operation for receiving the guidance service is performed by the user A, for example, on the key board 16, the controlling part 41 controls the communication controlling part 45 at step S201 to transmit the user ID stored in the user information storing part 42 and the signal for demanding the guidance service to be provided (hereinafter, referred to as guidance demand signal) to the navigation server 4.

At step S202, the controlling part 41 controls the communication controlling part 45 to receive the guidance data transmitted from the navigation server 4. At step S203, the controlling part 41 controls the input/output controlling part 43 and the voice input/output controlling part 44 to output the guidance data received at step S202. That is, if image data or text data is included in the guidance data, the image data or the text data is displayed on the LCD 18 via the input/output controlling part 43. Also, if voice data is included in the guidance data, the voice data is output from the speaker 22 via the voice input/output controlling part 44.

Next, at step S204, the controlling part 41 determines whether or not the operation for canceling the guidance service is performed, for example, on the key board 16. If it is determined that the operation is performed, a processing proceeds to step S205. At step S205, the controlling part 41 controls the communication controlling part 45 to transmit a signal for canceling the guidance data to be provided (hereinafter, referred to as guidance cancel signal) to the navigation server 4.

At step S204, if it is determined that the operation for canceling the guidance service is not performed, a processing proceeds to step S206, and the controlling part 41 determines whether or not a signal for indicating the transmission of all guidance data (hereinafter, referred to as data transmission completion signal) transmitted from the navigation server 4 is received by the communication controlling part 45. At step S206, it is determined that the data transmission completion signal is not received, the controlling part 41 executes the following processings.

If the guidance cancel signal is transmitted at step S205, or the data transmission completion signal is received at step S206, a processing terminates.

Figure 17:
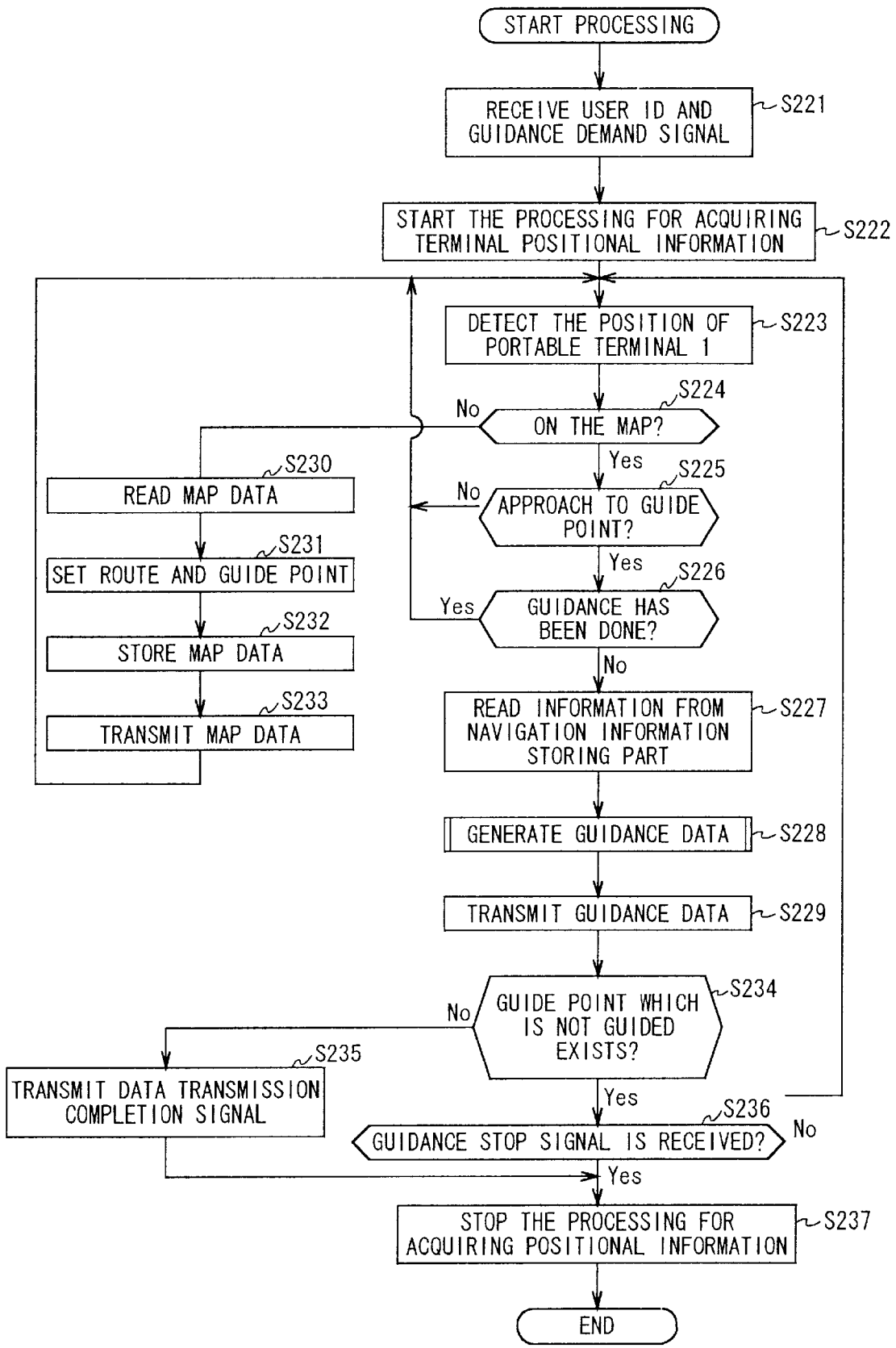
FIG. 17 is a flowchart explaining the procedure of the navigation server 4 when the guidance processing is executed.

Next, correspondingly to the procedure in the portable terminal 1 explained in the flowchart of FIG. 16, the procedure in the navigation server 4 when the guidance service is provided to the portable terminal 1 will be explained referring to the flowchart of FIG. 17. At step S221, the controlling part 61 of the navigation server 4 controls the communication controlling part 76 to receive the user ID and the guidance demand signal transmitted from the portable terminal 1.

At step S222, the controlling part 61 controls the terminal positional information acquiring part 70 to start the processing for receiving the user ID and the terminal positional information transmitted from the portable terminal 1 at a period T. Thereby, the terminal positional information acquiring part 70 receives the terminal positional information transmitted from the portable terminal 1 through the communication controlling part 76, and gives notice to the controlling part 61.

Next, at step S223, the controlling part 61 detects the position of the portable terminal 1 from the terminal positional information notified from the terminal positional information acquiring part 70. At step S224, the controlling part 61 determines whether or not the position of the portable terminal 1 detected at step S223 is included in the map data stored in the route search information storing part 69 corresponding to the user ID of the portable terminal 1 (map data stored at step S128 of FIG. 15). If it is determined that the position is included in the map data, a processing proceeds to step S225.

At step S225, the controlling part 61 detects the position relation between the portable terminal 1 and the guide point set on the map data corresponding to the user ID based on the position of the portable terminal 1 detected at step S223, and determines whether or not the guide point having a distance below a predetermined value for the portable terminal 1 exists. That is, the controlling part 61 determines whether or not the portable terminal 1 (user A) moves and approaches to the guide point (in the example of FIG. 2, building B, building F, or park Z).

At step S225, if it is determined that the guide point having a distance below a predetermined value for the portable terminal 1 does not exist yet, the controlling part 61 returns to step S223 to execute the following processings. At step S225, if it is determined that the guide point exists, the controlling part 61 proceeds to step S226 to determine whether or not a data-provided flag to be set at step S227 described later is set to the guidance data of the guide point detected at step S225, that is, whether or not the guidance data of the guide point has been already provided to the portable terminal 1.

At step S226, if it is determined that the data-provided flag is not set, that is, it is determined that the guidance data of the guide point is not provided to the portable terminal 1 yet, a processing proceeds to step S227.

In this way, the history of the provided guidance data is confirmed so that the guidance data of the same guide point can be prevented from being provided to the portable terminal 1 again and again, and the user A does not have to receive the same guidance data again and again.

At step S227, the controlling part 61 reads the information relating the guide point detected at step S225 from the navigation information storing part 68. At this time, the controlling part 61 sets the data-provided flag to the guide point detected at step S225.

Figure 18:
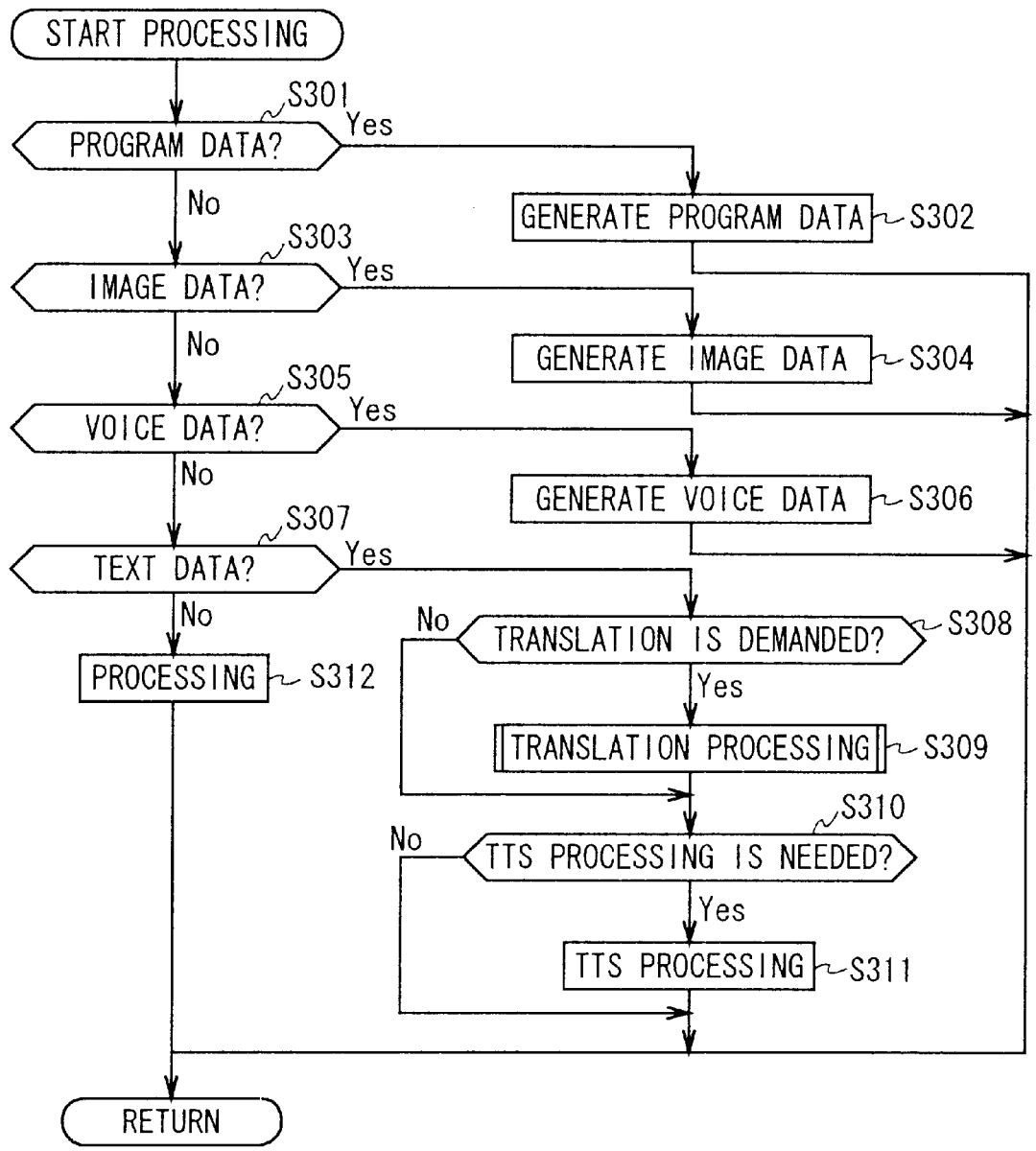
FIG. 18 is a flowchart explaining the procedure of the navigation server 4 when the guidance data generation processing is executed.

Next, at step S228, the guidance data is generated. The processing for generating guidance data at step S228 is shown in the flowchart of FIG. 18 in details.

More specifically, at step S301, the controlling part 61 determines whether or not the type of data read at step S227 is program data for controlling the portable terminal 1. At step S301, if it is determined that the type of data is program data, a processing proceeds to step S302. At step S302, the controlling part 61 controls the program data generating part 71 to generate guidance data (program data) based on the data read at step S227.

At step S301, if it is determined that the type of data read at step S227 is not program data, a processing proceeds to step S303 where it is determined whether or not the type of data is image data. At step S303, the type of data is determined as image data, a processing proceeds to step S304. At step S304, the controlling part 61 controls the image data generating part 72 to generate guidance data (image data) based on the data read at step S227.

At step S303, if it is determined that the type of data read at step S227 is not image data, a processing proceeds to step S305 where it is determined whether or not the type of data is voice data (code) used in a PCM, an ADPCM, or etc. At step S305, the type of data is determined as voice data, a processing proceeds to step S306. At step S306, the controlling part 61 controls the voice data generating part 73 to generate guidance data (voice data) based on the data read at step S227.

At step S305, if it is determined that the type of data read at step S227 is not voice data, a processing proceeds to step S307 where it is determined whether or not the type of data is text data. At step S307, the type of data is determined as text data, a processing proceeds to step S308. The text data read at step S227 is text data corresponding to the type of a predetermined language (e.g., Japanese).

At step S308, the controlling part 61 determines whether or not translation demand has been set to the route search conditions stored in the route search information storing part 69, and if it is set, a processing proceeds to step S309.

Figure 19:
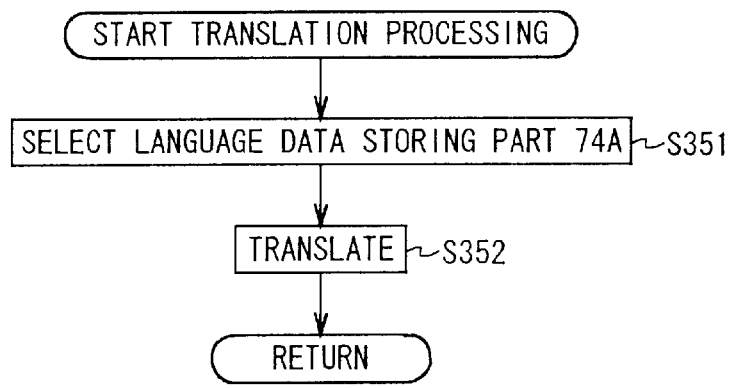
FIG. 19 is a flowchart explaining the procedure of the navigation server 4 when the translation processing is executed.

At step S309, the translation processing is executed, and is shown in the flowchart of FIG. 19 in details.

More specifically, the controlling part 61 notifies of the position (area) of the portable terminal 1 detected at step S223 to the translation processing part 74, so that the translation processing part 74 selects the language data storing part 74A corresponding to the position of the portable terminal 1 notified. For example, when the notified position indicates Japan, the language data storing part 74A-1 is selected, and when it indicates U.S.A., the language data storing part 74A-2 is selected.

Next, at step S352, the translation processing part 74 refers the language data storing part 74A selected at step S351 to convert (translate) the text data read at step S227 into the language used by the user A. Then, a processing terminates and returns to step S308 of FIG. 18.

At step S308, if it is determined that translation is not demanded or when the translation processing at step S309 has been completed, a processing proceeds to step S310, and the controlling part 61 determines whether or not the text data read at step S227 is necessary to be converted into voice data. Note that in this example, if it has to be converted into voice data, it is assumed that the necessity of conversion is designated in the text data. The processing for converting text data into voice data will be referred to as TTS processing hereinafter.

At step S310, if it is determined that the TTS processing is needed, a processing proceeds to step S311, and the controlling part 61 controls the TTS processing part 75 to perform the TTS processing on the text data that the translation processing at step S310 has been skipped or on the text data translated. Then, a processing terminates.

On the other hand, at step S310, if it is determined that the TTS processing is not needed, the processing at step S311 is skipped, and a processing terminates.

At step S307, if it is determined that the type of data read at step S227 is not text data, a processing proceeds to step S312. At step S312, the controlling part 61 determines that it is a predetermined control signal, and performs a predetermined processing itself to generate guidance data. Then, a processing terminates and proceeds to step S229 of FIG. 17.

The guidance data is generated from various data, correspondingly to the route search conditions set by the user A.

At step S229, the controlling part 61 controls the communication controlling part 76 to transmit the guidance data generated at step S228 to the portable terminal 1.

At step S224, if it is determined that the position of the portable terminal 1 detected at step S223 is not included in the map data stored in the route search information storing part 69, a processing proceeds to step S230, and the controlling part 61 reads the map data corresponding to the position of the portable terminal 1 from the navigation information storing part 68.

Next, at step S231, the controlling part 61 sets a route and a guide point in the map data read at step S230, and stores them in the route search information storing part 69 so as to correspond to the user ID at step S232. At step S233, the controlling part 61 controls the communication controlling part 76 to transmit the map data stored in the route search information storing part 69 to the portable terminal 1. Thereafter, the controlling part 61 returns to step S223 to execute the following processings.

On the other hand, when the guidance data is transmitted at step S229, a processing proceeds to step S234, and the controlling part 61 determines whether or not the user-provided flag for the user A is set in all of the set guide points, that is whether or not the guide point to be guided exists.

At step S234, if it is determined that the user-provided flag is set in all of the set guide points, that is the guide point which is not guided does not exist, a processing proceeds to step 235, and the controlling part 61 controls the communication controlling part 76 to transmit the data transmission completion signal to the portable terminal 1.

At step S234, if it is determined that the guide point which is not guided exists, a processing proceeds to step S236, and the controlling part 61 determines whether or not the guidance stop signal is received. If it is determined that the guidance stop signal is not received, a processing returns to step S223 to execute the following processings.

At step S2.36, if it is determined that the guidance stop signal is received, or at step S235, if it is determined that the data transmission completion signal is transmitted, a processing proceeds to step S237, and the controlling part 61 controls the terminal positional information acquiring part 70 to stop the acquirement processing of the terminal positional information in the portable terminal 1.

The example described above has been dealt with a case of transmitting to the portable terminal 1 no fewer than map data in which the route to be searched from the place where an user is now to the destination is specified as the result of the route search processing. However, such information as means of transportation, distance, time, and moving direction to the destination can be also provided in the portable terminal 1. Further, the detailed information of buildings or places other than the guide points can be provided in the portable terminal 1. In this case, since the data other than image data (e.g., voice data or text data) is transmitted to the portable terminal 1, the route search data is needed to be generated by the same processing as the case in the processing described in the flowchart of FIG. 18.

Further, the example described above has been dealt with a case that map data is displayed and guided in the portable terminal 1. However, the map data is not necessarily needed to be displayed, and guidance depending on only voice can be performed for example. In this case, the processings at step S107 of FIG. 14, steps S129, S130 of FIG. 15, step S233 of FIG. 17, etc. are omitted.

The example described above has been dealt with a case that a guide point is building or park. However, by setting exit station as a guide point, it can be notified to an user to approach to the exit station, so that the user is prevented from going beyond his/her destination.

As described above, since the place where the portable terminal which is registered in the navigation service providing system is now can be known by the navigation server 4, the position data of another portable terminal provided is received so as to know the place where an user carrying another portable terminal is now. Moreover, the movement to respective places where they are now can be guided each other.

Further, in addition to the user ID or language information, information such as birthday or blood type is registered in the SIM card 14 to be provided to the navigation server 4, so that so-called Affinity fortune-telling is performed in the navigation server 4 by the birthday or blood type of another user. As a result, the position data of the place where the compatible user is now provided can be received. Moreover, the information registered in the SIM card 14 can be stored in the user information storing part 62 previously.

Further, reservation functions of transport facilities and of accommodations are provided in the navigation server 4 so as to reserve the specified transport facilities and accommodations in the portable terminal 1.

In this description, the term "system" stands for the entire apparatus composed of a plurality of units, means, and so on.

Also, as a providing medium for providing a computer program performing the processing described above to an user, a communication medium such as network or satellite can be used in addition to a recording medium such as an opto-magnetic disc, a CD-ROM, and a solid memory.

Industrial Applicability

This invention can be utilized in a portable navigation system.

What is claimed is:

1. An information processing apparatus which is connectable to a predetermined server through a network, comprising:

detecting means for detecting positional information, said detecting means being operable to detect said positional information in any one of three different modes in which each mode utilizes a different one of (i) global positioning satellite (GPS) information, (ii) position input data supplied by a user, and (iii) information from a reference base station;

first transmitting means for transmitting the positional information detected by the detecting means to the server;

inputting means for inputting a desired route search condition from among a number of predetermined route search conditions;

second transmitting means for transmitting the route search conditions input by the inputting means to the server;

receiving means for receiving guidance data transmitted from the server, the guidance data corresponding to the positional information transmitted by the first transmitting means and corresponding to the route search conditions transmitted by the second transmitting means; and output controlling means for controlling the output of the guidance data received by the receiving means.

2. The information processing apparatus according to claim 1, further comprising:

map data receiving means for receiving map data transmitted from the server, the map data corresponding to the positional information transmitted by the first transmitting means and corresponding to the route search conditions transmitted by the second transmitting means; and display controlling means for controlling the display of the map data received by the map data receiving means.

3. The information processing apparatus according to claim 1, wherein:

when the route search conditions are input by voice, the inputting means performs sound analysis on the voice; and the second transmitting means transmits the result of sound analysis by the inputting means to the server.

4. An information processing method of an information processing apparatus which is connectable to a predetermined server through a network, comprising:

detecting step of detecting positional information, said detecting step being operable to detect said positional information in any one of three different modes in which each mode utilizes a different one of (i) global positioning satellite (GPS) information, (ii) position input data supplied by a user, and (iii) information from a reference base station;

first transmitting step of transmitting the positional information detected at the detecting step to the server;

inputting step of inputting a desired route search condition from among a number of predetermined route search conditions;

second transmitting step of transmitting the route search conditions input at the inputting step to the server;

receiving step of receiving guidance data transmitted from the server, the guidance data corresponding to the positional information transmitted at the first transmitting step and corresponding to the route search conditions transmitted at the second transmitting step; and output controlling step of controlling the output of the guidance data received at the receiving step.

5. The information processing method according to claim 4, further comprising:

map data receiving step of receiving map data transmitted from the server, the map data corresponding to the positional information transmitted at the first transmitting step and corresponding to the route search conditions transmitted at the second transmitting step; and display controlling step of controlling the display of the map data received at the map data receiving step.

6. The information processing method according to claim 4, wherein:

when the route search conditions are input by voice, sound analysis is performed on the voice at the inputting step; and at the second transmitting step, the result of sound analysis at the inputting step is transmitted to the server.

7. A providing medium for providing a program readable by a computer, which makes an information processing apparatus which is connectable to a predetermined server through a network to execute processings including:

detecting step of detecting positional information, said detecting step being operable to detect said positional information in any one of three different modes in which each mode utilizes a different one of (i) global positioning satellite (GPS) information, (ii) position input data supplied by a user, and (iii) information from a reference base station;

first transmitting step of transmitting the positional information detected at the detecting step to the server;

inputting step of inputting a desired route search condition from among a number of predetermined route search conditions;

second transmitting step of transmitting the route search conditions input at the inputting step to the server;

receiving step of receiving guidance data transmitted from the server, the guidance data corresponding to the positional information transmitted at the first transmitting step and corresponding to the route search conditions transmitted at the second transmitting step; and output controlling step of controlling the output of the guidance data received at the receiving step.

8. The providing medium according to claim 7, further comprising:

map data receiving step of receiving map data transmitted from the server, the map data corresponding to the positional information transmitted at the first transmitting step and corresponding to the route search conditions transmitted at the second transmitting step; and display controlling step of controlling the display of the map data received at the map data receiving step.

9. The providing medium according to claim 7, wherein:

when the route search conditions are input by voice, sound analysis is performed on the voice at the inputting step; and at the second transmitting step, the result of sound analysis at the inputting step is transmitted to the server.

10. An information processing apparatus which is connectable to a predetermined terminal through a network, comprising:

acquiring means for acquiring positional information transmitted from the terminal, said positional information being obtainable at the terminal by use of any one of three different modes in which each mode utilizes a different one of (i) global positioning satellite (GPS) information, (ii) position input data supplied by a user, and (iii) information from a reference base station;

receiving means for receiving a desired route search condition from among a number of predetermined route search conditions transmitted from the terminal;

detecting means for detecting map data corresponding to the route search conditions received by the receiving means;

setting means for setting guide point corresponding to the route search conditions received by the receiving means to the map data detected by the detecting means;

generating means for generating guidance data to guide the guide point set by the setting means, correspondingly to the positional information acquired by the acquiring means; and transmitting means for transmitting the guidance data generated by the generating means.

11. The information processing apparatus according to claim 10, wherein when the route search conditions a re transmitted from the terminal voice signal, the receiving means selects language data corresponding to the positional information acquired by the acquiring means so as to voice-recognize them on the basis of the selected language data.

12. The information processing apparatus according to claim 10, wherein when the route search conditions are transmitted from the terminal by analyzed data of voice, the receiving means selects language data corresponding to the positional information acquired by the acquiring means so as to voice-recognize them on the basis of the selected language data.

13. The information processing apparatus according to claim 10, wherein when the guidance data is text data, the generating means selects language data corresponding to the positional information acquired by the acquiring means so as to translate the text data on the basis of the selected language data.

14. The information processing apparatus according to claim 10, further comprising map data transmitting means for transmitting the map data in which the guide point is set by the setting means.

15. The information processing apparatus according to claim 10, wherein the guide point is sight spot, place or object for user's interest, or another terminal managed by the server.

16. The information processing apparatus according to claim 10, further comprising managing means for managing the transmittance number of time of the guidance data, on the basis of the provision history of the guidance data.

17. An information processing method of an information processing apparatus which is connectable to a predetermined terminal through a network, comprising:

acquiring step of acquiring positional information transmitted from the terminal, said positional information being obtainable at the terminal by use of any one of three different modes in which each mode utilizes a different one of (i) global positioning satellite (GPS) information, (ii) position input data supplied by a user, and (iii) information from a reference base station;

receiving step of receiving a desired route search condition from among a number of predetermined route search conditions transmitted from the terminal;

detecting step of detecting map data corresponding to the route search conditions received at the receiving step;

setting step of setting guide point corresponding to the route search conditions received at the receiving step to the map data detected at the detecting step;

generating step of generating guidance data to guide the guide point set at the setting step, correspondingly to the positional information acquired at the acquiring step; and transmitting step of transmitting the guidance data generated at the generating step.

18. The information processing method according to claim 17, wherein when the route search conditions are transmitted from the terminal by voice signal, at the receiving step, language data corresponding to the positional information acquired at the acquiring step is selected so as to voice-recognize them on the basis of the selected language data.

19. The information processing method according to claim 17, wherein when the route search conditions are transmitted from the terminal by analyzed data of voice, at the receiving step, language data corresponding to the positional information acquired at the acquiring step is selected so as to voice-recognize them on the basis of the selected language data.

20. The information processing method according to claim 17, further comprising map data transmitting step for transmitting the map data in which the guide point is set at the setting step.

21. The information processing method according to claim 17, wherein the route search conditions contains at least one of shortest route, shortest-duration course, sightseeing duration route for user's interest, and safety in route.

22. The information processing method according to claim 17, wherein the guide point is sight spot, place or object for user's interest, or another terminal managed by the server.

23. The information processing method according to claim 17, further comprising at the transmitting step, the transmittance number of time of the guidance data is managed on the basis of the provision history of the guidance data.

24. A providing medium for providing a program readable by a computer which makes an information processing apparatus which is connectable to a predetermined terminal through a network to execute processings including:

acquiring step of acquiring positional information transmitted from the terminal, said positional information being obtainable at the terminal by use of any one of three different modes in which each mode utilizes a different one of (i) global positioning satellite (GPS) information, (ii) position input data supplied by a user, and (iii) information from a reference base station;

receiving step of receiving a desired route search condition from among a number of predetermined route search conditions transmitted from the terminal;

detecting step of detecting map data corresponding to the route search conditions received at the receiving step;

setting step of setting guide point corresponding to the route search conditions received at the receiving step to the map data detected at the detecting step;

generating step of generating guidance data to guide the guide point set at the setting step, correspondingly to the positional information acquired at the acquiring step; and transmitting step of transmitting the guidance data generated at the generating step.

25. The providing medium according to claim 24, wherein when the route search conditions are transmitted from the terminal by voice signal, at the receiving step, language data corresponding to positional information acquired at the acquiring step is selected so as to voice-recognize them on the basis of the selected language data.

26. The providing medium according to claim 24, wherein when the route search conditions are transmitted from the terminal by analyzed data of voice, at the receiving step, language data corresponding to the positional information acquired at the acquiring step is selected so as to voice-recognize them on the basis of the selected language data.

27. The providing medium according claim 24, wherein when the guidance data is text, at the generating means, language data corresponding to the positional information acquired at the acquiring step is selected so as to translate the text data on the basis of the selected language data.

28. The providing medium according to claim 24, further comprising map data transmitting step of transmitting the map data in which the guide point is set at the setting step.

29. The providing medium according to claim 24, wherein the guide point is sight spot, place or object for user's interest, or another terminal managed by the server.

30. The providing medium according to claim 24, further comprising at the transmitting step, the transmittance number of time of the guidance data is managed on the basis of the provision history of the guidance data.

* * * * *